US011465045B1

(12) United States Patent
Buliani et al.

(10) Patent No.: US 11,465,045 B1
(45) Date of Patent: Oct. 11, 2022

(54) MAINTAINING SESSION STATE USING REDUNDANT SERVERS

(71) Applicant: Amazon Technologies, Inc., Seattle, WA (US)

(72) Inventors: Stefano Buliani, Seattle, WA (US); Yahav Biran, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 16/447,798

(22) Filed: Jun. 20, 2019

(51) Int. Cl.
| A63F 13/358 | (2014.01) |
| A63F 13/77 | (2014.01) |
| H04L 67/1027 | (2022.01) |
| H04L 67/1029 | (2022.01) |
| H04L 67/148 | (2022.01) |

(52) U.S. Cl.
CPC .......... A63F 13/358 (2014.09); A63F 13/77 (2014.09); H04L 67/1027 (2013.01); H04L 67/1029 (2013.01); H04L 67/148 (2013.01)

(58) Field of Classification Search
CPC .... A63F 13/358; A63F 13/77; H04L 67/1029; H04L 67/1027; H04L 67/148
See application file for complete search history.

(56) References Cited

U.S. PATENT DOCUMENTS

| 6,216,051 B1 * | 4/2001 | Hager, III | G05B 9/03 |
| | | | 700/82 |
| 2003/0177187 A1 * | 9/2003 | Levine | A63F 13/10 |
| | | | 709/205 |
| 2006/0031283 A1 * | 2/2006 | Tuttle | H04L 67/26 |
| | | | 709/203 |
| 2007/0087820 A1 | 4/2007 | Van Luchene et al. | |
| 2007/0174660 A1 * | 7/2007 | Peddada | H04L 41/0663 |
| | | | 714/4.1 |
| 2008/0070688 A1 | 3/2008 | Loehrer | |
| 2008/0108437 A1 * | 5/2008 | Kaarela | G07F 17/3223 |
| | | | 463/42 |
| 2011/0072430 A1 | 3/2011 | Mani | |
| 2016/0269440 A1 * | 9/2016 | Hartman | H04L 63/083 |

OTHER PUBLICATIONS

Office Action for U.S. Appl. No. 16/447,785, dated Jun. 26, 2020, Buliani, "Maintaining Session State Using Redundant Servers", 8 Pages.
Office Action for U.S. Appl. No. 16/447,785, dated Jan. 8, 2021, Buliani, "Maintaining Session State Using Redundant Servers", 11 pages.

* cited by examiner

*Primary Examiner* — Thomas H Henry
(74) *Attorney, Agent, or Firm* — Lee & Hayes, P.C.

(57) ABSTRACT

Techniques implemented by a game-hosting service to place a load balancer between client devices engaged in a game session and servers that maintain state data for the game session. Rather than having a single server maintain state data and host the game session, the load balancer will broadcast action data received from the client devices to the server that is hosting the game session, or "primary server," and also to a redundant server that is maintaining state data for the game session, or "secondary server." Thus, if the primary server is unable to continue hosting the session, the secondary server may begin hosting the game session using the state data maintained for the game session. Further, by offloading the network input/output (I/O) tasks of communicating with the client devices from the server to the load balancer, the server can allocate larger amounts of resources to hosting game sessions.

20 Claims, 14 Drawing Sheets

600 ⤴

```
┌─────────────────────────────────────────────────────────────────────────┐
│ HOST, AT A FIRST SERVER IN A SERVICE PROVIDER NETWORK, A SESSION ON     │
│ BEHALF OF A FIRST CLIENT DEVICE AND A SECOND CLIENT DEVICE, THE FIRST   │
│ SERVER STORING FIRST STATE DATA INDICATING A FIRST STATE OF THE SESSION │
│                                  602                                    │
└─────────────────────────────────────────────────────────────────────────┘
                                     ↓
┌─────────────────────────────────────────────────────────────────────────┐
│ STORE, AT A SECOND SERVER IN THE SERVICE PROVIDER NETWORK, SECOND       │
│ STATE DATA INDICATING THE FIRST STATE OF THE SESSION                    │
│                                  604                                    │
└─────────────────────────────────────────────────────────────────────────┘
                                     ↓
┌─────────────────────────────────────────────────────────────────────────┐
│ RECEIVE, AT A LOAD BALANCER IN THE SERVICE PROVIDER NETWORK, EVENT DATA │
│ FROM THE FIRST CLIENT DEVICE INDICATING AN EVENT FOR THE SESSION        │
│                                  606                                    │
└─────────────────────────────────────────────────────────────────────────┘
                                     ↓
┌─────────────────────────────────────────────────────────────────────────┐
│ SEND THE EVENT DATA TO THE FIRST SERVER AND THE SECOND SERVER           │
│                                  608                                    │
└─────────────────────────────────────────────────────────────────────────┘
                                     ↓
┌─────────────────────────────────────────────────────────────────────────┐
│ DETERMINE, AT THE FIRST SERVER, THIRD STATE DATA INDICATING A SECOND    │
│ STATE OF THE SESSION BASED AT LEAST IN PART ON THE EVENT DATA           │
│                                  610                                    │
└─────────────────────────────────────────────────────────────────────────┘
                                     ↓
┌─────────────────────────────────────────────────────────────────────────┐
│ DETERMINE, AT THE SECOND SERVER, FOURTH STATE DATA INDICATING THE       │
│ SECOND STATE OF THE SESSION BASED AT LEAST IN PART ON THE EVENT DATA    │
│                                  612                                    │
└─────────────────────────────────────────────────────────────────────────┘
                                     ↓
┌─────────────────────────────────────────────────────────────────────────┐
│ RECEIVE, AT THE LOAD BALANCER, RESULT DATA FROM THE FIRST SERVER        │
│ INDICATING A RESULT OF THE EVENT ON THE SESSION                         │
│                                  614                                    │
└─────────────────────────────────────────────────────────────────────────┘
                                     ↓
┌─────────────────────────────────────────────────────────────────────────┐
│ SEND, FROM THE LOAD BALANCER, THE RESULT DATA TO THE FIRST CLIENT       │
│ DEVICE AND THE SECOND CLIENT DEVICE                                     │
│                                  616                                    │
└─────────────────────────────────────────────────────────────────────────┘
```

MAINTAINING SESSION STATE USING REDUNDANT SERVERS

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide users with on-demand delivery of compute power, database storage, applications, and other resources, rather than the users having to make upfront investments in hardware and spend time and resources managing the hardware.

Often, users that subscribe to the service provider for use of computing resources in the service provider network also provide products or services to their own clients. In such examples, the computing needs of the subscribers may dynamically scale based on a time of day when their clients are active. For example, the service provider network may provide a game-hosting service to game developers that deploys, operates, and scales session-based game servers in the service provider network for clients of the game developers. In this way, a game developer that has developed an online game may host their session-based, online game using virtual machine (VM) instances running on servers of the service provider network that are accessible by clients of the game developer.

Game-hosting services that host game sessions for clients can experience technical inefficiencies or issues that can impact the user experience, such as undesirable network latency, overutilization of computing resources, server failure, etc. In light of these types of issues, game-hosting services continue to try and increase user satisfaction and improve underlying computing-infrastructure utilization.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example method for a game-hosting service to store state data for a session at a first server hosting the session and a second server.

DETAILED DESCRIPTION

Figure 1A:
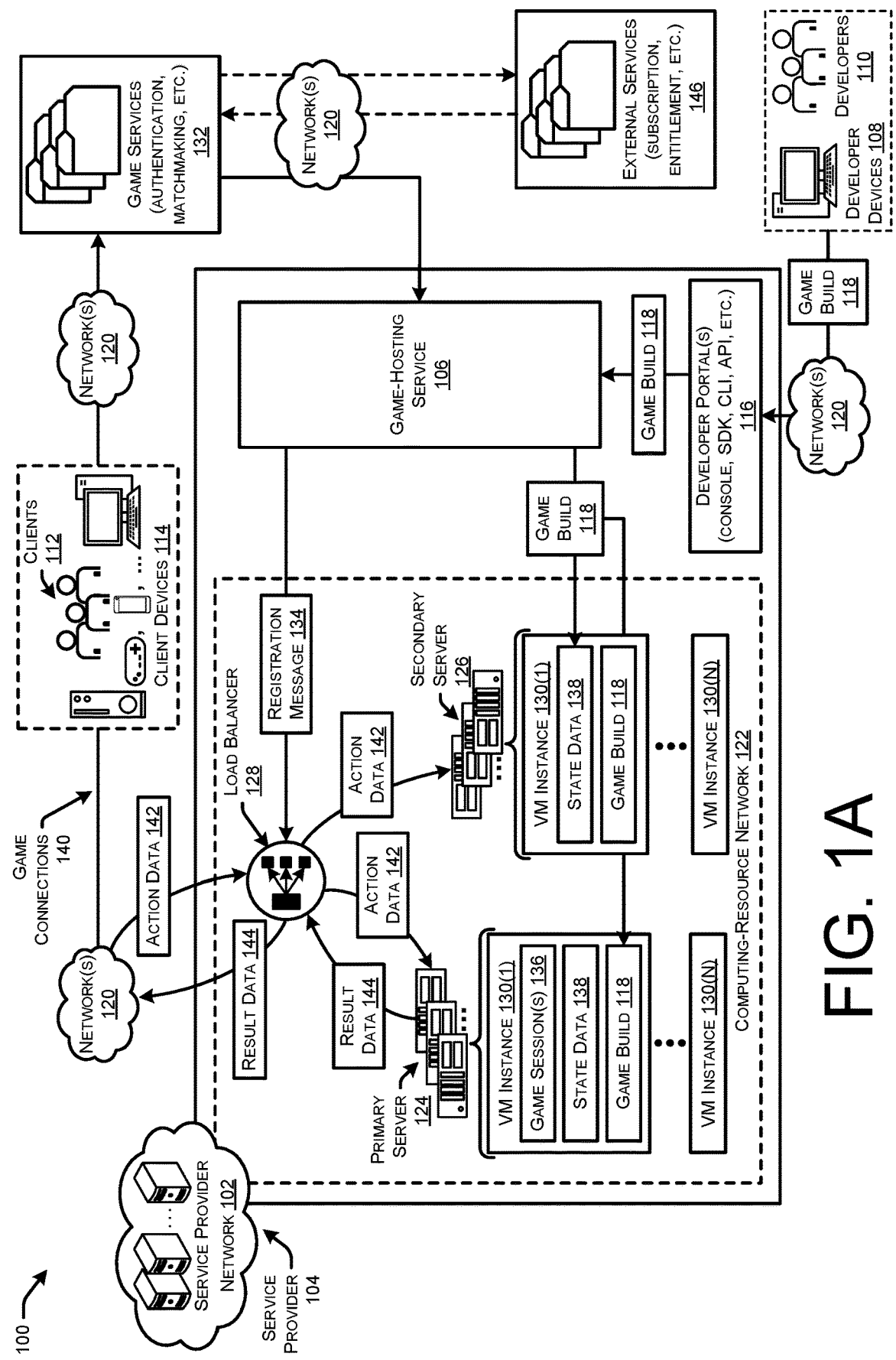
FIGS. 1A and 1B illustrate a system-architecture diagram of an example environment in which a game-hosting service of a service provider network places a load balancer between client devices in a game session and servers that are maintaining state data representing a state of the game session.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services (or "subscribers") need not invest in and maintain the computing infrastructure required to implement the various services that they may need. Additionally, subscribers and their clients are able to access these network-based services over different geographic regions. To offer these network-based services across geographic areas, service providers operate and maintain service provider networks (e.g., cloud-based computing environments, network-based service architectures, network-based service infrastructures, etc.). In this way, service provider networks may provide subscribers with scalable, on-demand, and network-accessible computing platforms over large geographic regions such that the subscribers have readily-available VM instances at their disposal. These service provider networks allow subscribers to immediately have computing infrastructure over large geographic regions to fulfill individual computing needs of the subscriber, and also to provide computing resources to support services provided to clients of the subscribers.

For example, a subscriber to the service provider network may be a game developer (e.g., individual, company, and/or other organization) that has developed an online, session-based game that they would like to provide to clients who desire to play the online game. However, the game developer may desire to provide access to their online game to clients over large geographic regions, and for large amounts of users. The amount of computing infrastructure (e.g., compute power, memory, storage networking, security, etc.) used to support and maintain an online gaming platform over different geographic regions that hosts game sessions for clients may be large enough to be impractical for game developers, particularly new or emerging game developers, to purchase and maintain on their own.

Accordingly, service provider networks may provide a game-hosting service that is a fully, or at least partially, managed online gaming platform. The game-hosting service may deploy, operate, and scale session-based online game servers in the service provider network on behalf of game developers. The game-hosting service may provide groups, or "fleets," of virtual machine instances (e.g., VM instances, instances, etc.) that run on computing resources of the service provider network and host game sessions for clients of a subscribing game developer. Depending on how many clients are requesting and engaged in online game sessions, the game-hosting service may spin up, or spin down, VM instances on behalf of the game developer to host an appropriate number of game sessions. Further, depending on the size of the game, complexity of the game, number of clients engaged in a single game session, and/or other factors, each VM instance may be able to run multiple game sessions of the online game for clients of the developer.

In some examples, a single server (e.g., physical server, hardware server, etc.) may host a game session (or multiple game sessions) on behalf of client devices. Generally, the server (or host) will maintain game state data indicating a state of the game session and serving as the authoritative source of events in the game session. Users engaged in the game session provide input (e.g., actions, events, etc.) into the game session using their client devices, which is transmitted to the server that is hosting the game session. The server receives the action data (or "event data") from the client devices, determines a result of the actions on the game session, and rebroadcasts out result data to the client devices that represents a result of the actions performed by other users in the game session. In this way, the server that is hosting the game session maintains game state data that is the authoritative source of events/actions in the game session, and transmits updates/results for the game state data to the client devices to allow the connected client devices to maintain their own accurate game state of the game session for display to the users.

However, servers may experience various technical issues or inefficiencies, such as latency issues, server failures, overutilization of underlying resources, etc. For example, if the server that is hosting the game session experiences a server failure, "dies" or otherwise "goes down," the game state data for that game session may be lost, and the client devices disconnected from the game session. As another example, if hardware resources of the server are being overutilized, the game session can experience latency, slowed computing of actions of users that causes game lag, reduced frame rate, and/or other undesirable issues for users in the game session and may cause users to quit playing the online game.

This disclosure describes, at least in part, techniques and technologies implemented by a game-hosting service of a service provider network to place a load balancer between client devices in a game session and servers that are maintaining state data representing a state of the game session. Rather than having a single server maintain the state data and host the game session, the load balancer may broadcast the action data received from the client devices to the server that is hosting the game session, or "primary server," and also to a redundant server that is maintaining the game state data for the game session, or "secondary server." In this way, if the primary server fails or otherwise is unable to continue hosting the session, the secondary server may seamlessly begin hosting the game session using the state data that has been maintained for the game session. Thus, the use of the secondary server to maintain the game state data increases the resiliency of game sessions by spreading state data among two or more servers so that game sessions do not die from a single server failure. Further, by offloading the network input/output (I/O) tasks of receiving action data from client devices, and broadcasting out result data to the client devices, from the servers to the load balancer, the servers are able to allocate larger amounts of resources to hosting game sessions. In this way, the infrastructure utilization of the servers is improved, and may allow the servers to host larger numbers of game sessions.

To provide the game-hosting service, the service provider network may include one or more matchmaking servers that receive requests from client devices to begin hosting a game session for a particular online game. To initialize a game session, the matchmaking server may utilize a rules engine that matches clients (or players) together based on player attributes, and sends a session-registration message to the load balancer that includes a session identifier (ID) for the game session as well as server IDs for the primary and secondary servers that are allocated for hosting the game session. The load balancer may then designate one of the servers as the primary server to host the game session, and another server as the secondary server to maintain the state data. For each game session that the load balancer is involved in, the load balancer may maintain an in-memory state listing of sessions and their associated servers.

Once the game session has been established on the servers, the client devices may begin communicating with the load balancer. For instance, the client devices may send action data representing actions taken by users engaged in the game (e.g., move a character from position x to position y in a virtual gaming world, begin construction of a building in a virtual gaming world, etc.). The load balancer may receive the action data as a payload in a message that includes an indication of the session ID in which the client device is engaged. The load balancer may further retain an in-memory state listing of the client IDs for the client devices that are engaged in the game sessions. Thus, the load balancer may receive action data which indicates a game session ID, determine server IDs for the primary and secondary servers that are maintain state data for the game session, and send the action data to the primary and secondary servers for the game session.

The primary and secondary servers may each continually calculate and update the state data for the game session using the action data and rules of the game session (e.g., game software). The primary and secondary servers may each determine a result of the actions in the game session as the state of the game session evolves and update the state data to represent the changes caused by the actions taken by the users. In some examples, the primary server may then determine result data that indicates the state data for the game session, or at least changes in the state data caused by actions received from the client devices. Rather than the primary server broadcasting the result data back to the client devices, the primary server may simply send the result data to the load balancer along with an indication of the list of client IDs for the client devices engaged in the game session. Upon receiving the result data and the indication of the list of client IDs for the client devices, the load balancer may then send or broadcast messages to the client devices that include the result data for the game session. The client devices may then update the state of the game session running locally on the device, and display the appropriate version of the online game world to the user of the client device.

By offloading the network I/O tasks from being performed by the primary server that is hosting the game session to being performed by a load balancer, the resources of the primary server are dedicated to maintaining the state data and hosting the game session. In some examples, the load balancer allows the servers to host additional game sessions, thereby improving the infrastructure utilization of the servers. Additionally, the load balancer may be more optimized, or more specialized, for performing network I/O tasks, thereby increasing the efficiency of the service provider network for implementing a game-hosting service (e.g., using specialized or biased resources to perform tasks for which they are optimized).

In some examples, the load balancer may determine that the primary server has experienced a server failure, or is otherwise unable to host the game session. For instance, the load balancer may determine that the primary server has not communicated with the load balancer for more than a threshold period of time. In such examples, the load balancer may identify, from the in-memory storage (e.g., mappings), a server ID for the secondary server that is maintaining the state data for the game session. The load balancer may then designate the secondary server as the server that is hosting the game session and begin listening to the secondary server for result data. Previously, the load balancer may have been ignoring, or not receiving result data from the secondary server, but still broadcasting action data to the secondary server so the secondary server can update the state data for the game session.

As client devices continue to send action data, the load balancer may seamlessly transition the game session from being hosted by the primary server to the secondary server. The load balancer may open a communication channel with the secondary server and receive, via a communication protocol, result data indicating an updated state of the game session. The load balancer may then broadcast the result data to the client devices such that the client devices, and players, may be unaware a different physical server is hosting the game session. In some examples, the load balancer may select and designate another server to be used as a secondary server for the game session.

The techniques described herein may be performed by one or more devices in a game-hosting service that may be a centralized server or cluster of servers (and other network devices) configured to host game sessions on behalf of users of client devices. In some examples, the game-hosting service may be included in a service provider network that is managed, maintained, and/or offered by a service provider. The techniques may be performed at least in part by the load balancer, the primary server, the secondary server, and/or on other devices included in or associated with the service provider network.

The techniques described herein improve the functioning of game-hosting services in various ways. For instance, by implementing a redundant, secondary server to maintain state data for a game session and having a load balancer handle network I/O tasks, the resiliency of the game-hosting service for hosting game sessions is increased by spreading game session compute over multiple nodes. Additionally, the infrastructure utilization of the servers is increased by offloading the I/O-heavy tasks, such as message broadcast, to the load balancer. Additionally, in some examples, the load balancer may comprise hardware and/or platforms (e.g., virtual machines) that are optimized, biased, or otherwise specialized to handle network I/O tasks, whereas the servers may be optimized, biased, or otherwise specialized servers for handling compute of hosting game sessions. In this way, the servers are able to host additional game sessions by offloading network I/O tasks, and the load balancers are optimized to handle the network I/O tasks. Thus, the underlying hardware and/or virtual resources of the service provider network may be more efficiently utilized, and the resiliency of the game-hosting service when hosting game sessions is increased.

Although the techniques are described herein as being applicable to game sessions, the techniques are generally applicable to any session-based, real-time communication applications. Any type of "session" that can be hosted on a server may benefit or utilize these techniques, and a game session is merely one illustrative example. For instance, the techniques may be applicable to a communication session (e.g., video conference, text messenger, network call, etc.), work session (e.g., virtual private network (VPN) session, desktop session, etc.), and/or other any other type of session. In some examples, at least some of the techniques may be performed locally at the client devices. For instance, rather than having a load balancer implemented, the client devices may send the action data directly to the servers (e.g., primary server and secondary server) for redundancy of the state data. Further, other types of devices may be utilized in addition to, or as an alternative to, the load balancer and servers described herein. Additionally, while the techniques are described as being performed in a service provider network of a service provider, the techniques may similarly be applied in other computing networks, such as on-premise servers managed by the game developers themselves.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an example environment 100 in which a game-hosting service of a service provider network 102 places a load balancer between client devices in a game session and servers that are maintaining state data representing a state of the game session.

As illustrated, the service provider network 102 may be operated and/or managed by a service provider 104. The service provider network 102 may provide various services to users to fulfill their computing resource needs, such as cloud-based computing resources. For example, the service provider network 102 may provide cloud-based, scalable, and network accessible compute power services, storage services, database services, and/or other services. As illustrated, the service provider network may also provide a game-hosting service 106 that is a scalable, cloud-based runtime environment for online games, including session-based multiplayer games. The game-hosting service 106 may be fully managed by the service provider 104 and deploy, operate, and scale the session-based multiplayer game servers in the cloud-based, or network-based, environment. For example, the game-hosting service 106 may not only provide the hardware to host the game sessions, but also manage ongoing activity, security, storage, and performance tracking. Additionally, the game-hosting service 106 may provide auto-scaling capabilities such that instances supporting game sessions can be spun up or spun down based on player demand.

To utilize the game-hosting service 106, developers 110 may utilize developer devices 108 to register for an account with the game-hosting service 106. This may allow the developers 110 to provide their clients 112 with access to an online game via their client devices 114 without the developers 110 having to invest in the computing resources (e.g., on-premise resources) needed to host the online game sessions for their clients 112. In order to utilize the game-hosting service 106, the developers 110 may provide a game build 118 to the game-hosting service 106 via one or more developer portals 116. The developer portal(s) 116 may include one or more of a web-based console, a software-development kit (SDK), a command-line interface (CLI), an application programming interface (API), and/or any other means by which a developer 110 may specify and/or provide a game build 118 to the game-hosting service 106.

The game build 118 may correspond to any type of online game that may host a game session for one or more clients 112 (or "players"). For instance, the game build 118 may correspond to a session-based single player online game, or a session-based multiplayer online game. The game build may represent any type of online game, such as real-time strategy (RTS) games, first person shooter (FPS) games, multiplayer online battle arena (MOBA) games, role playing (RPG) games, massively multiplayer online (MMO) games, massively multiplayer online role player games (MMORPG), virtual board games (e.g., chess, checkers, etc.), action-adventure games, simulation games, strategy games, sports games, virtual reality games, and/or any other game that may be played in an online environment.

Generally, the client devices 114 may comprise any type of computing device that may be utilized for online gaming. For instance, the client devices 114 may include laptop computing devices, desktop computing devices, mobile phones, gaming systems, controller-based devices, virtual and/or augmented reality devices, wearable devices, biometric sensors, projectors, televisions, and/or any computing device usable on its own, or in conjunction with other devices, for online gaming. In some examples, at least part of the online game may execute and/or be stored locally on the client devices 114.

The game build 118 may include the game software for the online game, and may further include server executables, supporting assets, libraries, and dependencies that are all used to host and/or execute the game software on an instance. The developers 110 may provide the game build 118 through the developer portal(s) 116, such as by uploading the game build 118 over one or more networks 120 (e.g., the Internet, WANs, PANs, LANs, etc.). The network(s) 120 may comprise any type of network or combination of network, including wired and/or wireless networks. Once a developer 110 has uploaded their game build 118, the game-hosting service 106 may store the game build 118 for future use to deploy to servers in a computing-resource network 122 that host game sessions. For instance, game software may be installed on one of more virtual machine (VM) instances that are supported by the servers of the computing-resource network 122.

As illustrated in FIG. 1, the game build 118 (or at least a portion thereof) may be provided to the VM instances 130. The game build 118 may include the binary code that is executed by the VM instances 130 to host or execute a game session 136 and maintain state data 138. In some examples, the game-hosting service 106 may provide the game build to VM instances 130, such as when they are spun up to host a game session 136. In other examples, the developer devices 108 may provide the game build 118 directly to the VM instances 130.

The computing-resource network 122 may include data centers that each include one or more computing resources, such as a primary server 124, a secondary server 126, a load balancer 128, and/or other network devices. Any number of servers and/or other network devices may be included in the computing-resource network 122. Generally, the primary server 124 and secondary server 126 may each support one or more VM instances 130(1) to 130(N) where "N" is any integer greater than 2 (referred to herein collectively as "VM instances 130" "or just "instances 130"). The data centers may house various servers or devices, such as the primary and secondary servers 124/126, and may be located across disparate geographical regions such that computing resources are available to support functionality for cloud-based services provided by the service provider network 102. The computing resources may include various combinations of hardware-based components, such as central processing units (CPU), graphics processing units (GPU), memory, storage, network capacity, security, and/or any other type of hardware-based resource to support cloud-based services, such as the game-hosting service 106. In some examples, the computing resource network 122 may further include respective memories that store various firmware-based and/or software-based resources that provide the functionality of the services, such as the instances 130 on which an agent executes, the game software executes, and one or more processes execute to support a game session.

In some examples, each VM instance 130 may include or execute a software agent that may be responsible for handling various processes on an instance 130, such as spinning up an instance 130, spinning down an instance 130, handling lifetime processes of the instance 130, retrieving pending game sessions from a queue to be executed on the instance 130, managing resources of the instance 130, installing patches and/or other software on the instance 130 and/or various other actions for managing the instance 130.

In some examples, each VM instance 130 may support a game session 136 that engages one or more clients via their client device(s) 114. That is, each VM instance 130 may support at least one game session 136, or multiple game sessions 136. For instance, the VM instance 130 may each be running the game software to support a game session 136 for one or more clients 112. However, in some examples and depending on the game, a VM instance 130 may handle multiple game sessions 136, and/or perform other tasks besides hosting a game session 136 to help manage game sessions 136, interact with client devices 114 and/or the game-hosting service 106, and/or perform other actions. The VM instances 130 may be virtual computing resources running on the servers 124/126 that consume or utilize the underlying hardware resources and/or other resources.

To play in a game session, the client devices 114 may interact directly with the game-hosting service 106, and/or through various backend game services to retrieve information on current game sessions, to request new game sessions, and/or reserve slots in game sessions. For instance, the client devices 114 may interact, over one or more networks 120, with game services 132 that may handle communication between client devices 114 and the game-hosting service 106. Further, the game services 132 may handle additional tasks or provide additional services, such as player authentication and authorizations, team building and matchmaking, and inventory control. For example, when a client 112 wants to join a game, the client device 114 may call the authentication service to first verify the client's 112 identity, and then send a player slot request to the game-hosting service 106.

Although illustrated as being outside the service provider network 102, some or all of the devices of the game services 132 may be internal to the service provider network 102. The game services may include one or more matchmaking servers that receive requests from client devices 114 to engage in a game session 136, and provide an indication to the game-hosting service 106, and/or directly to a load balancer 128, that the client devices 114 are requesting to enter a game session 136. The game-hosting service 106 and/or a matchmaking server may provide a registration message 134 to the load balancer 128. Depending on the type of online game, the match making service and/or component may not be utilized. For instance, some online games do not utilize any type of match making for their clients 112 that are engaged in the game sessions 136.

Generally, to establish or join a game session 136, clients 112 may utilize their client devices 114 (e.g., applications, software, or other programs executing thereon) to request (e.g., API call) that the game-hosting service 106 place them in a game session. The game-hosting service 106 may launch a server process to host a game session, or identify an already running process that is hosting a game session 136. Thus, the game-hosting service 106 may either identify an active game session that has an open player slot in the game session, or launch a new process to host a game session 136 for the requesting client device 114. After identifying an open player slot, the client application running on the client device 114 may create a game connection 140 by connecting directly, over the network(s) 120, to the open game server 124 using a player session ID. The server process may then accept the player ID as a valid ID and accepts, or rejects, the game connection 140. If connected, the player session is set to active and the client 112 begins playing the game using their client device 114 and the game connection 140 that is established between the game server 124 that has the instance 130 with the process executing to host the selected game session. Once a game session 136 has ended (e.g., clients 112 quit, the game ends, time out, etc.), the client application on each of the involved client devices 114 may disconnect from the process, and the game-hosting service 106 can change the game session 136 to terminated, upload a game session log to storage, and update a fleet utilization to indicate that the game server 124 has one less process executing 132. Underutilized game servers 124 may request additional game sessions if they are concurrently executing less than the specified number of processes 132 indicated in configuration data.

The load balancer 128 may comprise any type of device that acts as a communication proxy by distributing network and/or application traffic across a number of servers 124/126, and/or the client devices 114. According to the techniques described herein, the load balancer 128 (or generally a "network device") may be disposed between client devices 114 and the primary server 124 as well as a secondary server 126. Generally, the load balancer 128 may receive the registration message 134 that includes an indication of a session identifier (ID) for a game session 136, and may also include server IDs for the primary serve 124 and the secondary server 126 that are to maintain state data 138 representing a state of the game session 136. The load balancer 128 may store mapping data indicating the session ID for the game session 136 is mapped to server IDs for the primary server 124 and the secondary server 126 that are maintaining the state data 138 for the game session 136. Further, the load balancer 128 may store an indication that the primary server 124 is the server that is hosting the game session 136, and the secondary server 126 is a backup server that is maintaining the state data 138 for the game session 136, but not actually sending back result data for changes in the game session 136. Although illustrated as having a single primary server 124 and a single secondary server 126, the load balancer 128 may communicate on behalf of two or more primary servers 124 and two or more secondary servers 126. Additionally, each of the servers 124/126 may host multiple game sessions 136 and/or store multiple state data 138.

The client devices 114 that are engaged in the game session 136 may establish game connections 140 over the network(s) 120 with the load balancer 128. The client devices 114 may receive input from clients 112 that indicate actions or events taken by the clients while engaged in the game session 136. Generally, the client devices 114 may store at least a portion of the state data 138 representing the state of the game session 136 and display or otherwise output (e.g., audio output, haptic output, etc.) the current state of the game for the clients 112 to consume. The clients 112 may then provide input indicating an action or event they would like to take with respect to the game session 136. The client devices 114 may generate action data 142 (or "event data") representing the actions or events, and transmit the action data 142 to the load balancer 128. In some examples, the client devices 114 may also provide an indication of the session ID for the game session 136 and/or a client ID for the client device 114.

The load balancer determines, based on the session ID included in the action data 142 (and/or client device ID), the server IDs for the primary server 124 and the secondary server 126. The load balancer 128 may then transmit, broadcast, multicast, or otherwise send the action data 142 to the primary server 124 and also the secondary server 126. The primary server 124 and the secondary server 126 may utilize the action data 142 to update the state data 138 based on the rules that govern the game being hosted. For instance, the game software included in the game build 118 that has been deployed to the VM instances 130 may generally define rules which dictate outcomes of the action data 142 with respect to the game session 136. For instance, action data 142 may represent a client 112 having their character in the game interact with another character of a different client 112 in the game, software may govern the result of that interaction. As another example, the action data 142 may represent a client 112 moving their character into different positions through a virtual world or environment, and the game software may represent the character's movement. The primary server 124 and the secondary server 126 may each be executing the game software and process action data 142 received from the load balancer 128 to update or modify the state data 138 to represent the current state of the game session 136 based on actions taken by the clients 112.

As noted above, each of the primary server 124 and the secondary server 126 may continually or periodically update the state data 138 based on the action data 142 received via the load balancer 128. However, only the primary server 124 may be hosting the game session 136 such that the primary server 124 sends back result data 144 indicating a result of the actions in the action data 142 on the game session 136. In some examples, the result data 144 may comprise the state data 138 after being updated, or at least a portion of the state data 138, such as at least the portion that has changed based on action data 142 received from the client devices 114. The primary server 124 may provide the load balancer 128 with the result data 144 that represents result(s) of the action data 142 on the game session 136 (e.g., changes in the state data 138). Further, the primary server 124 may provide the load balancer 128 with an indication of the session ID for the game session 136, and/or a listing or indication of the client IDs for the client devices 114 that are to receive the result data 144 and are included in the game session 136. In some examples, the secondary server 126 may also attempt to send back result data 144 to the load balancer 128, but the load balancer 128 may disregard result data 144 from servers that are not designated, selected, or otherwise indicated as being primary servers 124 that are hosting game sessions 136.

In some examples, the result data 144 may indicate incremental changes in the state data 138 determined by the action data 142 received from clients 112 from a previous time the state data 138 may updated. In various examples, the result data 144 may comprise some or all of the state data 138 that represents the "world state" of the game session 136 in its entirety. For instance, the client devices 12 may have their own version of the game state data that needs to be updated based on the actions taken by other clients 112. The result data 144 may comprise the entire state data 138 that represents the world state of the game so that client devices 114 can render the online game using the world state as all engaged players of clients 112 see the game.

In some examples, the primary server 124 may further provide the load balancer 128 with a protocol version or other data usable to validate the result data 144 received from the primary server 124. Depending on the communication protocol used, the load balancer 128 may validate the message that includes the result data 144 using various methods or technologies Upon receiving the result data 144, the load balancer 128 may transmit, broadcast, or otherwise send the result data 144 to the client devices 114 over the network(s) 120 to update the state of the game on each client devices 114 such that the clients 112 know what actions other clients are taking, and also the results of the actions that they took in the game session 136.

In some examples, the online game of a developer 110 may rely on or utilize one or more additional external services 146, such as for validating a subscription membership and/or determining entitlements for a client's account. As shown, the information from the external services 146 may be passed to the game server(s) 124/126 via the game services 132 and the game-hosting service 106 without going through the client device(s) 114.

In some examples, the game-hosting service 106 may deploy a group of instances 130, often referred to as a "fleet" of instances 130, on game servers 124/126. In various examples, a fleet of instances 130 may all support the same game build 118, or the same online game. Each instance 130 in a fleet may run multiple processes simultaneously, depending on the hardware capability, and each server process can host at least one game session. Since a game build 118 can have one or multiple executable files, a developer 110 and/or the service provider 104 may configure a fleet to run multiple server processes of each executable on each instance 130.

Figure 1B:
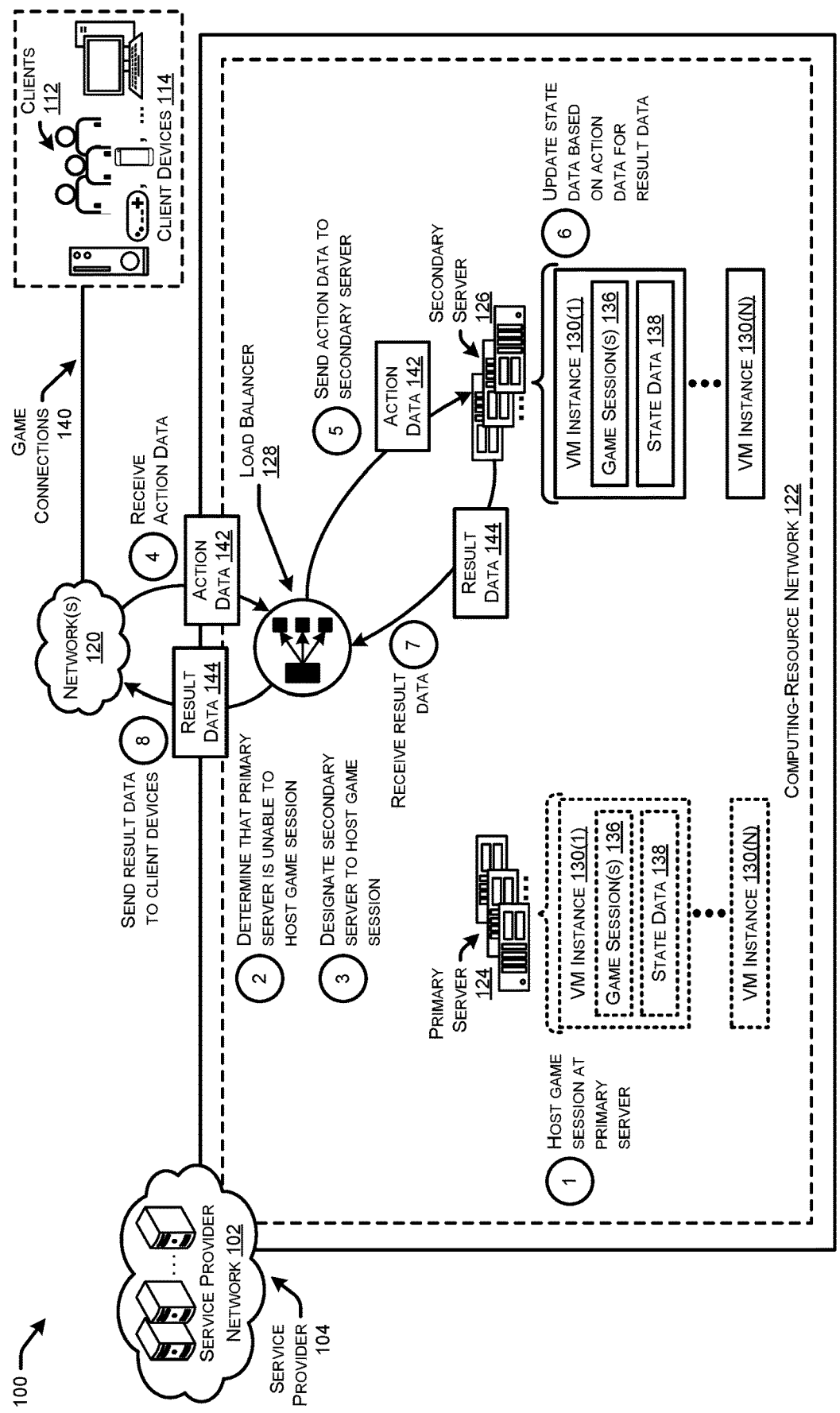

FIG. 1B illustrates a system-architecture diagram of an example environment 100 in which the game-hosting service 106 of the service provider network 102 determines that the primary server 124 is unable to host the game session 136, and begins using the secondary server 126 to host the game session 136.

At "1", the service provider network 102 is hosting the game session 136 at the primary server 124. In some examples, hosting the game session 136 includes receiving action data 142 from the load balancer 128, determining updated game state data 138 based on the action data 142 for the game session 136 using rules of the online game, and providing result data 144 to the load balancer 128 indicating a result of the action on the game state data 138.

At "2", the load balancer 128 may determine that the primary server 124 is unable to host the game session 136. The load balancer 128 may determine this using one or more methods. For example, the load balancer 128 may determine that the primary server 124 has not communicated back data (e.g., result data 144) for a threshold period of time after receiving action data. In some examples, the load balancer 128 may "ping" the primary server 124 to determine if the server 124 is responsive, and if the primary server 124 does not respond to the ping within a threshold period of time, the load balancer 128 may determine that the primary server 124 is unable to host the game session 136. In some examples, the load balancer 128 (and/or another server or device) may determine that the primary server 124 has experienced a server failure and is unable to host the game session 136.

In some examples, the load balancer 128 may determine that the primary server 124 is unable to host the game session because of an indication that primary server 124 is being reclaimed by the service provider. This may be the case where the primary server 124, and possibly the secondary server 126, were initially allocated as unused capacity for the service provider. Such unused capacity can be offered at a discount with the potential that some of the unused capacity might be reclaimed to satisfy requirements of a newly received request. In some instances, the service provider will provide an indication that some unused capacity needs to be reclaimed some period of time prior to actually reclaiming the unused capacity, which can trigger a determination that the primary server 124 is unable to host game session 136. In such an example, the embodiments described herein can provide for additional stability by enabling the primary server 124 to be reclaimed and, in response, the secondary server 126 can take over hosting the game session.

In some examples, to determine that the primary server 124 is unable to host the game session 136, the load balancer 128 (and/or another device in the service provider network 102) may receive or obtain performance data or health metrics from one or more of the game sessions 136 executing on the instances 130. For example, an agent may determine or receive, for a process running on the instance 130, a current frame rate of the CPU and/or GPU hosting the game session (e.g., 20 FPS, 40 FPS, 60 FPS, etc.), a percentage and/or amount of memory of the instance 130 being utilized by one or all of the processes, a percentage and/or amount of compute power of the instance 130 being utilized by one or all of the processes, an amount of network bandwidth being utilized by a process, and/or any other data indicative of, or affecting, performance of the game session (s). The agent may continuously, periodically, and/or based on a predefined event, collect the data and/or health values and provide the health values to the load balancer 128 or another device. The load balancer 128 may determine whether the health values are below acceptable, threshold health values for the VM instance 130. If the health values are below the threshold value, the load balancer 128 may determine that the primary server 124 is unable to host the game session 136.

At "3", the load balancer 128 may designate or select the secondary server 126 for hosting the game session 136. In some examples, the load balancer 128 may remove an indication from memory that the secondary server 126 is a backup, redundant, or otherwise the secondary server 126. Further, the load balancer 128 may store an indication in memory that the secondary server 126 is now to host the game session 136, or is now the "primary" server.

At "4", the load balancer 128 may receive action data 142 from a client device 114. At "5", the load balancer 128 may send the action data 142 to the secondary server 126. In some examples, the load balancer 128 may have further designated a new redundant server, and further multicast or otherwise send the action data 142 to another, redundant server.

At "6", the secondary server 126 may update the state data 138 based on the action data 142 to generate result data 144. For instance, the secondary server 126 may utilize the game software, which defines rules of the game, to evaluate the action data 142 with respect to the current state data 138 to update the state data 138 based on a result of the evaluation. In this way, the secondary server 126 may generate the result data 144 and send back the result data 144 to the load balancer 128. In some examples, the result data 144 may further be sent with an indication of client IDs for the client devices 114 engaged in the game session 136, and/or a protocol version or other protocol data to validate the message that includes the result data 144.

At "7", the load balancer 128 may receive the result data 144, and at "8" the load balancer 128 may send the result data 144 to the client devices 114 that are engaged in the game session 136. The client devices 114 may utilize the result data 144 to update the state data for the game session 136 locally on the client devices 114, and present the current state of the game session 136 on a display (and/or using another output means such as audio, haptic, etc.) of the client device 114 for the client 112 to consume.

Figure 2:
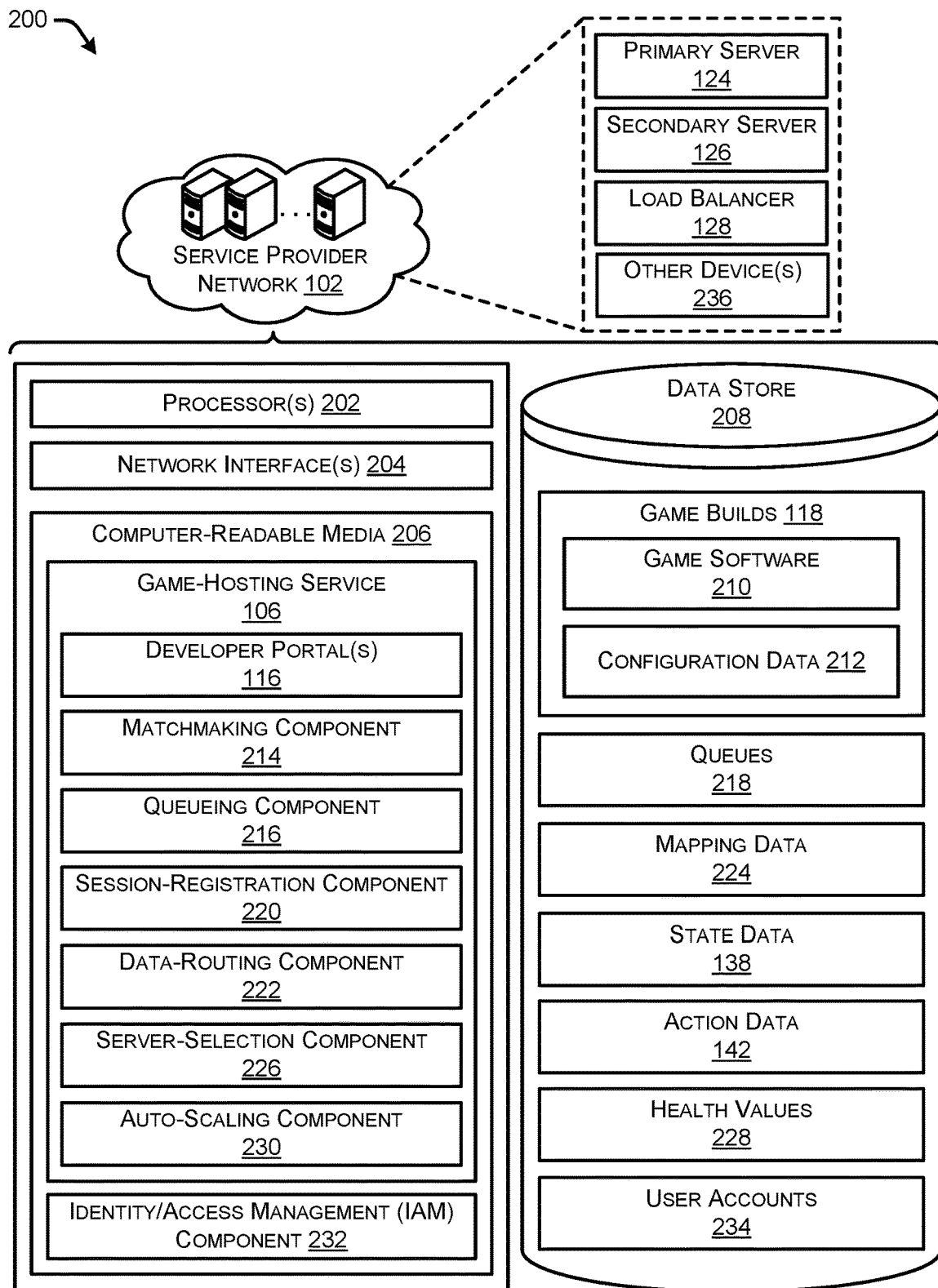
FIG. 2 illustrates a component diagram of an example service provider network that provides a game-hosting service that utilizes a load balancer and multiple servers to support game sessions on behalf of client devices.

FIG. 2 illustrates a component diagram 200 of an example service provider network 102 that provides a game-hosting service 106 that utilizes a load balancer 128 and multiple servers 124/126 to support game sessions 136 on behalf of client devices 114. In some examples, the components of the service provider network 102 described below may be located on one or more of the primary server 124, secondary server 126, load balancer 128, and/or one or more other devices 236 included in the service provider network 102 (e.g., other servers running components or processes). Stated otherwise, the techniques described herein may be performed by various arrangements, architectures, or systems of devices.

As illustrated, the service provider network 102 may include one or more hardware processors 202 (processors) configured to execute one or more stored instructions. The processor(s) 202 may comprise one or more cores. Further, the service provider network 102 may include one or more network interfaces 204 configured to provide communications between the service provider network 102 and other devices, such as the developer device(s) 108 and/or the client device(s) 114. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS® SERVER operating system from MICROSOFT Corporation of Redmond, Wash. According to further embodiments, the operating system(s) can comprise the UNIX operating system or one of its variants. It should be appreciated that other operating systems can also be utilized.

The computer-readable media 206 may store portions, or components, of the game-hosting service 106 described herein. For instance, the computer-readable media 206 may store the developer portal(s) 116 through which developer(s) 110 may provide their game builds 118, and/or other input for managing their online games. Additionally, the computer-readable media 206 may store a client-interface component (not illustrated) configured to provide portals, user interfaces, and/or other avenues through which clients 112 may interact with the online games hosted by the game-hosting service 102 and/or account settings for user accounts.

The computer-readable media 206 may further store a matchmaking component 214 configured to, when executed by the processor(s) 202, provide various matchmaking functionality for the game-hosting service 106. Generally, the matchmaking component 214 may include a customizable rules engine that allows developers 110 to design how to match clients 112 (or players) together based on player attributes and game modes that are appropriate for the online game. The matchmaking component 214 may further manage the details for forming player groups for game sessions, and placing the player groups into active or recently created/initiated game sessions.

The computer-readable media 206 may further store a queueing component 216 configured to, when executed by the processor(s) 202, manage queues for placing new game sessions with appropriate or available hosting resources (e.g., instances 130) across fleets and/or geographic regions. Generally, the matchmaking component 214 builds on the queueing component 216 because, once a match is created, the matchmaking component 214 may hand or send the match details to a queue 218 that is managed by the queueing component 216. The queueing component 216 may then search for available hosting resources in the fleet of instances 130 and starts a new game session for the players in the match.

The computer-readable media 206 may further store a session-registration component 220 that works in conjunction with the matchmaking component 214 and/or queueing component 216 to register sessions with a load balancer 128. The session-registration component 220 may generate and send the registration messages 134 to the load balancers 128 that indicate session IDs for game sessions 136, server IDs for servers 124/126 that host the game sessions 136, and/or client IDs for the client devices 114 engaged in the game session 136. Further, the session-registration component 220 may indicate the request for the game session 136 to be created, if not already created.

The computer-readable media 206 may further store a data-routing component 222 that utilizes mapping data 224 to determine how to route various data between devices or other endpoints. For instance, the data-routing component 222 may utilize the mapping data 224 to determine which servers 124/126 are to receive action data 142 based on client IDs, session IDs, and/or server IDs. Further, the data-routing component 22 may utilize the mapping data 224 to determine which client devices 114 are to receive the result data 144 for the game sessions 136 based on session IDs and/or client IDs.

The computer-readable media 206 may further store a server-selection component 226 that determines or selects an available or open server to host a game session 136 and/or to store state data 138. In some examples, the server-selection component 226 may determine which server(s) to use for a game session 136 based on session IDs and/or server IDs included in a registration message 134.

The computer-readable media 206 may further store an auto-scaling component 230 that, when executed by the processor(s) 202, scales up or down the number of instances 130 available to host game sessions 136 or other processes. For example, the auto-scaling component 230 may provide a fast, efficient, and accurate way to match fleet capacity to player usage. In some examples, the auto-scaling component 230 may track the fleet's hosting metrics and determine when to add or remove instances 130 based on a set of guidelines, called policies, that may be defined by the developer 110. The auto-scaling component 230 can adjust capacity in response to changes in player demand to help ensure that the fleet of instances 130 has availability for new players without maintaining an excessive amount of idle resources.

To utilize the services provided by the service provider network 102, clients 112 and developers 110 may register for an account with the service provider network 102. For instance, clients 112 and developers 110 may utilize a device to interact with an identity and access management (IAM) component 232 that allows the clients 112 and developers 110 to create an account with the service provider network 102. Generally, the IAM component 232 may enable the clients 112 and developers 110 to manage access to their cloud-based services and computing resources securely. Using the IAM component 232, the developers 110 may manage their game builds 118 and/or fleets of instances 130 as described herein. Additionally, clients 112 may interact with their account to, for example, change settings for their gaming experience, management payments, and/or other functions.

The service provider network 102 may further store one or more data stores 208 (e.g., object storage) that stores various data described herein at one or more locations in the service provider network 102. The data store 208 may include the game builds 118 for developers 110 that include game software 210 and initial configuration data 212, along with other data described herein. The data store 208 may further store the health values 228 for processes, updated configuration data that has been generated for instances 130, the queues 218 in which new player groups or game groups are queued before being placed into instances 130, user accounts 234 for the clients 112 and/or developers 110, and generated updated configuration data 212 defining permissible limits for numbers of concurrently executing processes.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service-provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
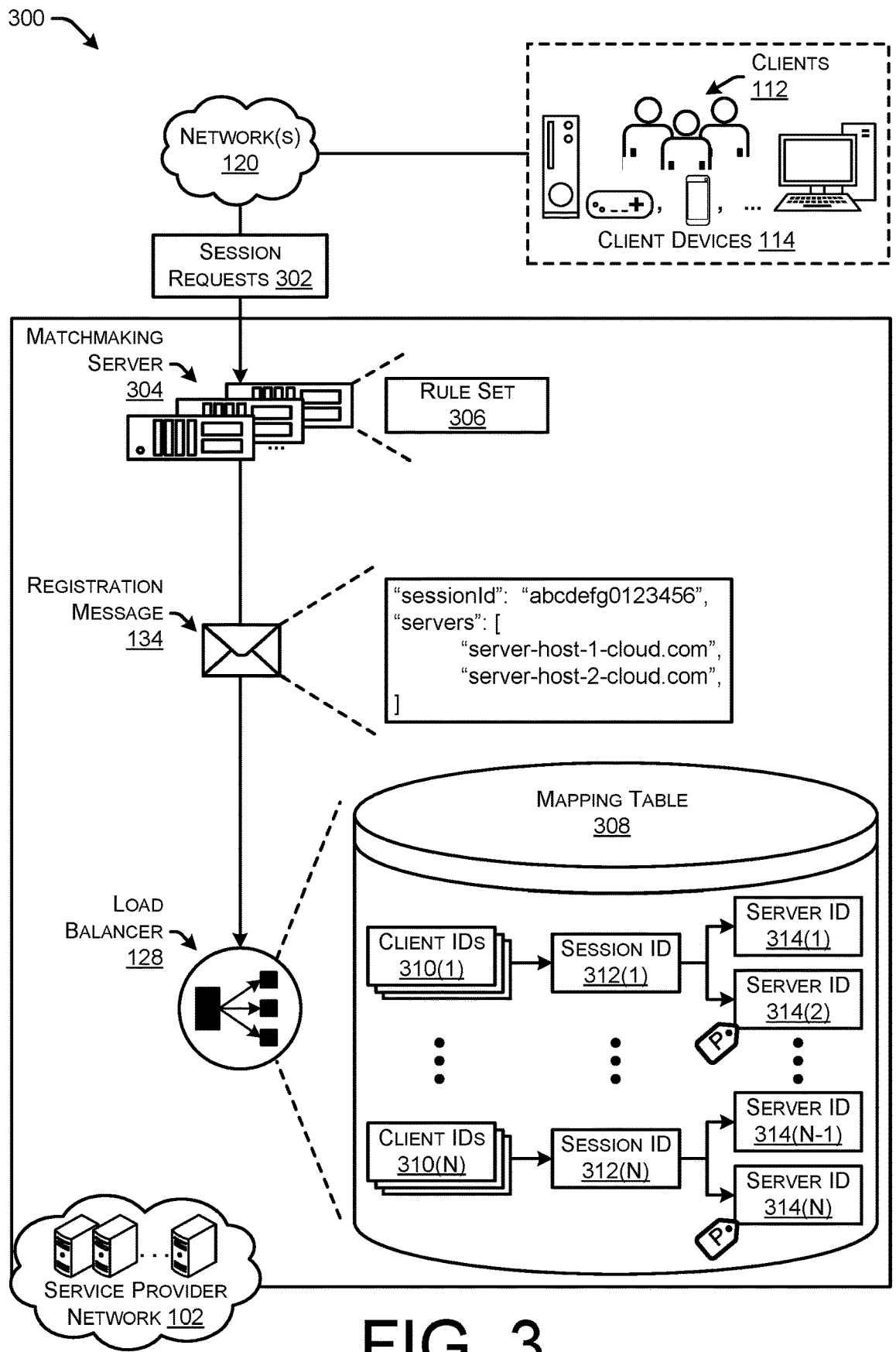
FIG. 3 illustrates a data-flow diagram in an example architecture for receiving a registration message from a matchmaking server to register a game session, and storing mapping data for the game session at a load balancer.

FIG. 3 illustrates a data-flow diagram in an example architecture 300 for receiving a registration message 134 from a matchmaking server to register a game session 136, and storing mapping data 224 for the game session 136 at a load balancer 128.

One or more client devices 114 may send session requests 302 to one or more matchmaking servers 304 indicating requests to play a particular online game that is hosted in the service provider network 102. The session requests 302 may indicate the online game, as well as an indication of an account 234 of the client 112. The matchmaking server 304 may place the client devices 114 into a game session group or player group using a rule set 306. For instance, a matchmaking component 214 may execute on the matchmaking server 304 and include a rule set 306 that groups clients 112 based on various factors, such as location, game preferences, experience or skill of the clients 112, and/or other factors.

The matchmaking server 304 may then send a registration message 134 to a load balancer 128 to register the client devices 114 in a game session 136. As illustrated, the registration message 134 may include an indication of a session ID for a new, or existing, game session 136. Additionally, the registration message 134 may include an indication of one or more servers that are to host the game session 136, or are currently hosting a game session 136. In some examples, the server IDs in the registration message 134 may correspond to a primary server 124 that hosts the game session 136 and a secondary server 126 that stores state data 138 that represents the state of the game session 136.

The load balancer 128 may be storing a mapping table 308, or other mapping data 224, that indicates associations or mappings between client IDs 310 to session IDs 312, and session IDs 312 to server IDs 314. Each load balancer 128 may support one, or multiple, game sessions. As illustrated, a first listing of client IDs 310(1) may map to a first session ID 312(1) for a game session 136 in which the corresponding client devices 114 are engaged. The session ID 312(1)

for the game session 136 may in turn be mapped to first server ID 314(1) for a primary server 124 that is hosting the game session 136, and also be mapped to a second server ID 314(2) for a secondary server 126 that is storing state data 138 for the game session 136. The load balancer 128 may store mappings in the mapping table 208 for "N" number of client devices 114, game sessions 136, and servers 124/126, where "N" is any integer greater than 1.

The load balancer 128 may receive the registration message 134, and either add a client ID 310 for the requesting client device(s) 114 to a listing of client IDs 310 that map to the appropriate session ID 312, or select new servers 124/ 126 to host a new game session 136 for one or more client devices 114. In either instance, the load balancer 128 may update the mapping table 308 to indicate the client devices 114 being added to an existing game session 136, or being engaged in a new game session 136.

Figure 4:
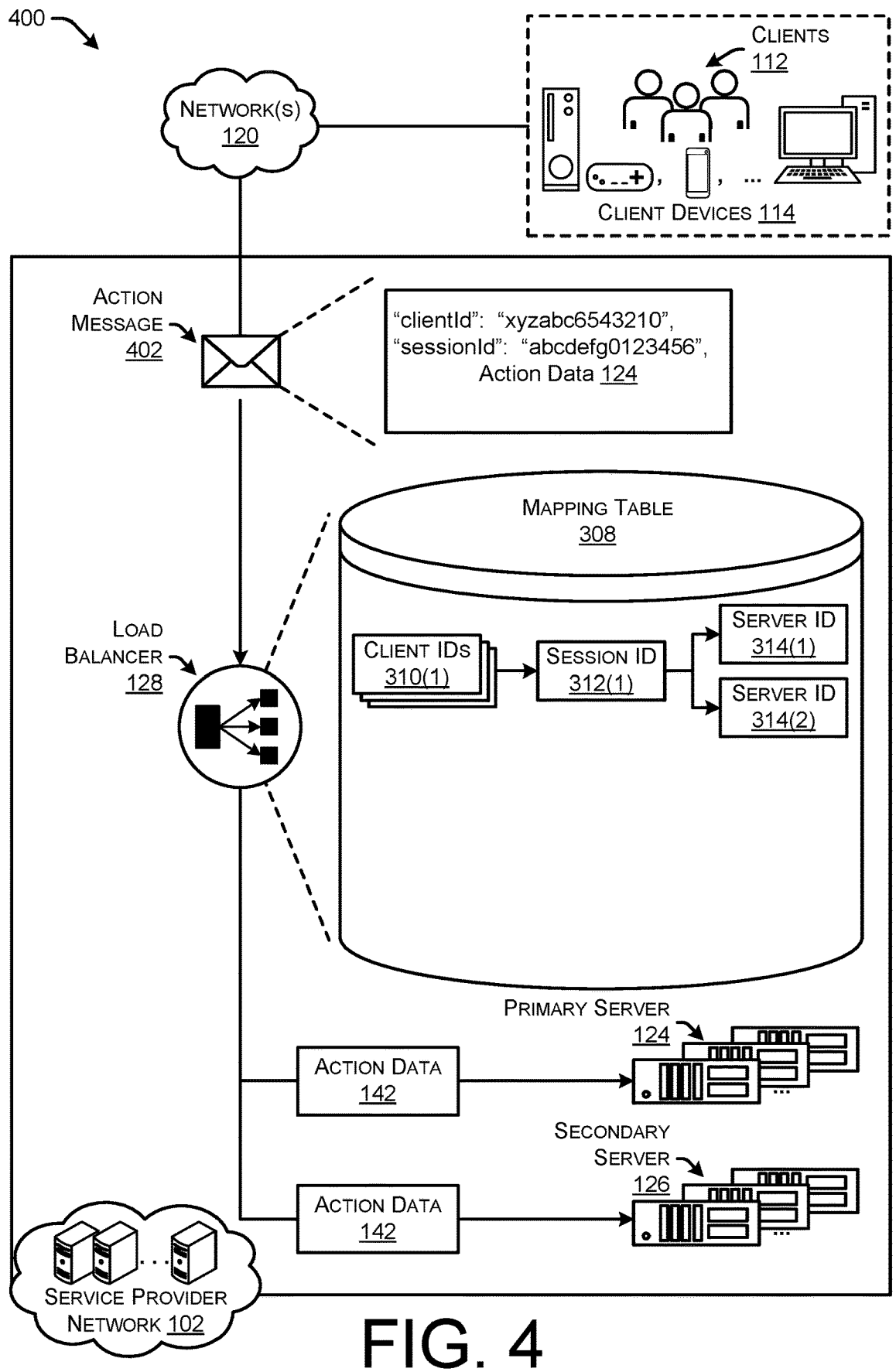
FIG. 4 illustrates a data-flow diagram in an example architecture for receiving an action message that includes action data from a client device, determining a game session and servers for the client device that sent the action message, and sending the action data to the corresponding servers for the game session.

FIG. 4 illustrates a data-flow diagram in an example architecture 400 for receiving an action message that includes action data from a client device, determining a game session and servers for the client device that sent the action message, and sending the action data to the corresponding servers for the game session.

As illustrated, a client device 114 may send an action message 402 to a load balancer in a service provider network 102. The action message 402 may include an indication of a client ID (or "device ID") for the client device 114, a session ID for the game session 136 in which the client device 114 is engaged, and the action data 124 representing the action taken by the client 112 operating the client device 114.

The load balancer 128 may receive the action message 402 and determine, using the information in the action message 402, which session ID 312 represents the game session 136 in which the client device 114 is engaged. The load balancer 128 may analyze the mapping table 308 and identify which server IDs 314 are mapped to, or associated with, the session ID 312 indicated in the action message 402 (or which client ID 310 is indicated in the action message 402). The load balancer 128 may then send the action data 142 to the primary server 124 and secondary server 126 that have server IDs 314 that were identified as corresponding to a session ID 312 of the game session 136 in which the client device 114 is engaged.

As illustrated in FIG. 3, the server IDs may be associated with tags that indicate which server is the primary server 124. The tags may be any type of indication stored in memory that indicates the primary server, and further the secondary server may be associated with a tag as well. The tags including the letter "P" are merely illustrative of an indication stored in memory of a server ID.

FIGS. 5A, 5B, 6, 7, 8, and 9 illustrate flow diagrams of example methods 500, 600, 700, 1000, and 1100 that illustrates aspects of the functions performed at least partly by the service provider network 102 as described in FIGS. 1-4. The logical operations described herein with respect to FIGS. 5A, 5B, 6, 7, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A, 5B, 6, 7, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5A:
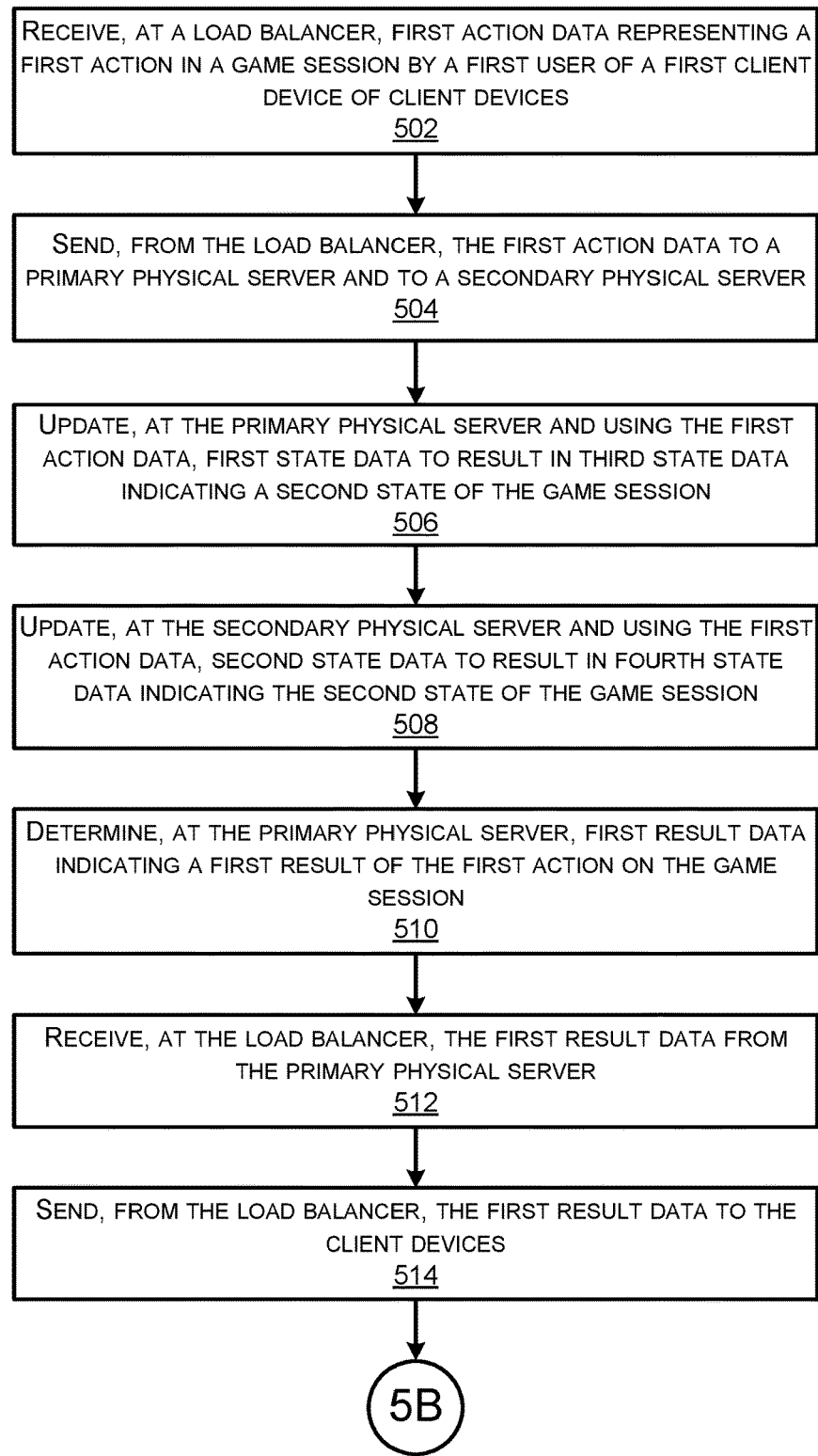
FIGS. 5A and 5B illustrate a flow diagram of an example method for a game-hosting service to maintain game state data for a game session using a primary server and a secondary server, and migrate hosting of the game session to the secondary server due to a server failure in the primary server.
Figure 5B:
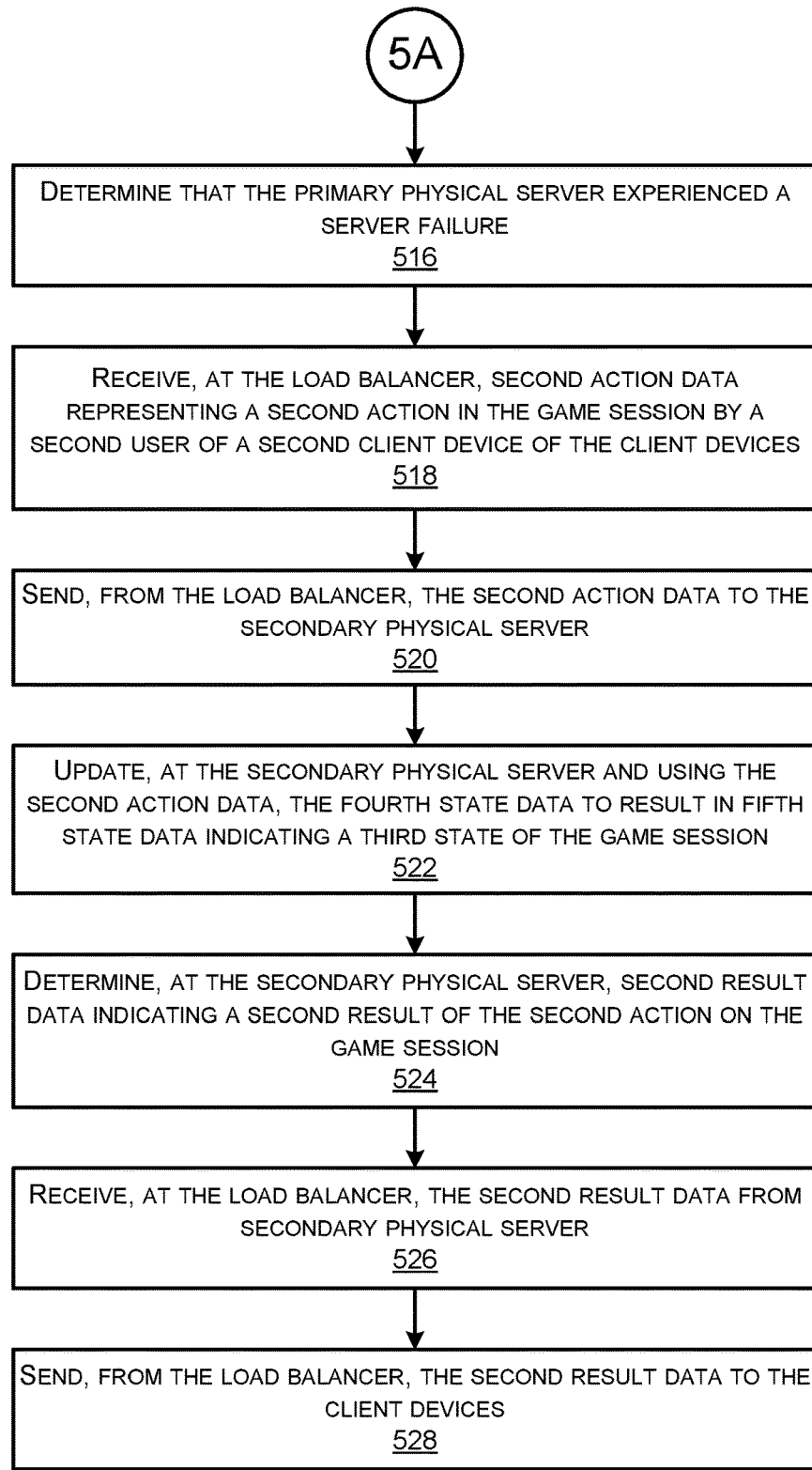

FIGS. 5A and 5B illustrate a flow diagram of an example method 500 for a game-hosting service 106 to maintain game state data 138 for a game session 136 using a primary server 124 and a secondary server 126, and migrate hosting of the game session 136 to the secondary server 126 due to a server failure in the primary server 124.

In some examples, the method 500 may be performed by a system comprising a primary physical server 124, disposed in a service provider network 102, hosting a game session 136 on behalf of client devices 114 and storing first state data 138 indicating a first state of the game session 136, and a secondary physical server 126, disposed in the service provider network 102, storing second state data 138 indicating the first state of the game session 136. Further, the system may include a load balancer 128, disposed in the service provider network 102, that is communicatively coupled to the primary physical server 124 and the secondary physical server 126. The system may include one or more processors and one or more computer-readable media storing computer-executable instructions that, when executed by the one or more processors, cause the one or more processors to perform operations of method 500.

At 502, the load balancer 128 may receive first action data 142 representing a first action in the game session 136 by a first user (or client 112) of a first client device 114 of the client devices 114.

At 504, the load balancer may send the first action data 142 to the primary physical server 124 and to the secondary physical server 126, such as by using multicasting. As 506, primary physical server 124 may update, using the first action data 142, the first state data 138 to result in third state data 138 indicating a second state of the game session 136. Further, at 508, the secondary physical server 126 may update using the first action data 142, the second state data 138 to result in fourth state data 138 indicating the second state of the game session 136.

At 510, the primary physical server 124 may determine first result data 144 indicating a first result of the first action on the game session 136. At 512, the load balancer 128 may receive the first result data 144 from the primary physical server 124. At 514, the load balancer 128 may send the first result data 144 to the client devices 114 that are engaged in the game session 136.

At 516, the load balancer 128 may determine that the primary physical server 124 experienced a server failure. In some examples, determining that the primary physical server 124 experienced the server failure comprises determining that a threshold period of time has passed from the primary physical server 124 sending the first result data 144. In some examples, determining that the primary physical server 124 experienced the server failure may comprise receiving a health value that is lower than a threshold health value (e.g., low frame rate, poor latency, etc.).

In some examples, the method 500 may further include, prior to the primary physical server 124 experiencing the server failure, storing, at the load balancer 128, a first indication that the primary physical server 124 is hosting the game session 136 (e.g., designate the primary physical server 124 as hosting the game session 136). Further, the method 500 may further include, subsequent to the primary physical server 124 experiencing the server failure, storing, at the load balancer 128, a second indication that the secondary physical server 126 is hosting the game session 136.

At 518, the load balancer 128 may receive second action data 142 representing a second action in the game session 136 by a second user 112 of a second client device 114 of the client devices 144. At 520, the load balancer 128 may send the second action data 142 to the secondary physical server 126. At 522, the secondary physical server 126 may update, using the second action data 142, the fourth state data 138 to result in fifth state data 138 indicating a third state of the game session 136. At 524, the secondary physical server 126 may determine second result data 144 indicating a second result of the second action on the game session 136. At 526, the load balancer 128 may receive the second result data 144 from the secondary physical server 126. At 528, the load balancer 128 may send the second result data 144 to the client devices 114.

FIG. 6 illustrates a flow diagram of an example method 600 for a game-hosting service 106 to store state data 138 for a session at a first server 124 hosting the session and a second server 126.

At 602, a first server 124 in a service provider network 102 may host a session 136 on behalf of a first client device 114 and a second client device 114. The first server 124 may further store first state data 138 indicating a first state of the session 136. The session may be a gaming session, or any other type of communication session.

At 604, a second server 126 in the service provider network 102 may store second state data 138 indicating the first state of the session 136. At 606, a load balancer 128 in the service provider network 102 may receive event data (e.g., action data 142) from the first client device 114 indicating an event for the session 136.

At 606, the load balancer 128 may send the event data 142 to the first server 124 and the second server 126, such as by multicasting or broadcasting the event data 142. At 608, the first server 124 may determine third state data 138 indicating a second state of the session 136 based at least in part on the event data 142. At 610, the second server 126 may determine fourth state data 138 indicating the second state of the session 136 based at least in part on the event data 142.

At 612, the load balancer 128 may receive result data 144 from the first server 124 indicating a result of the event on the session 136. At 614, the load balancer 128 may send the result data 144 to the first client device 114 and the second client device 114.

In some examples, the method 600 may further include storing, at the load balancer 128, a first indication that the first server 124 is hosting the session 136 on behalf of the first client device 114 and the second client device 114, and storing, at the load balancer 128, a second indication that the second server 126 is storing state data indicating a state of the session 126. In such examples, the method 600 may further comprise determining that the first server 124 is unable to host the session, removing the first indication from being stored at the load balancer 128, and storing, at the load balancer 128, a third indication that the second server 126 is hosting the session 136 on behalf of the first client device 114 and the second client device 114.

In some examples, the method 600 may further include storing, at the load balancer 128, an indication that that first server is hosting the session, receiving, at the load balancer 128 and from the second server 126, additional result data 144 indicating the result of the event on the session 136, and based at least in part on the indication that the first server 124 is hosting the session 136, disregarding the additional result data 144 received from the second server 126.

In some examples, the method 600 may further include determining that the first server 124 is unable to host the session 136, receiving, at the load balancer 128, second event data 142 from at least one of the first client device 114 or the second client device 114 indicating a second event associated with the session 136, sending the second event data 142 to the second server 126, determining, at the second server 126, fifth state data 138 indicating a third state of the session 136 based at least in part on the second event data 138, receiving, at the load balancer 128, second result data 144 from the second server 126 indicating a second result of the second event on the session 136, and sending, from the load balancer 128, the second result data 144 to the first client device 114 and the second client device 114.

Figure 7:
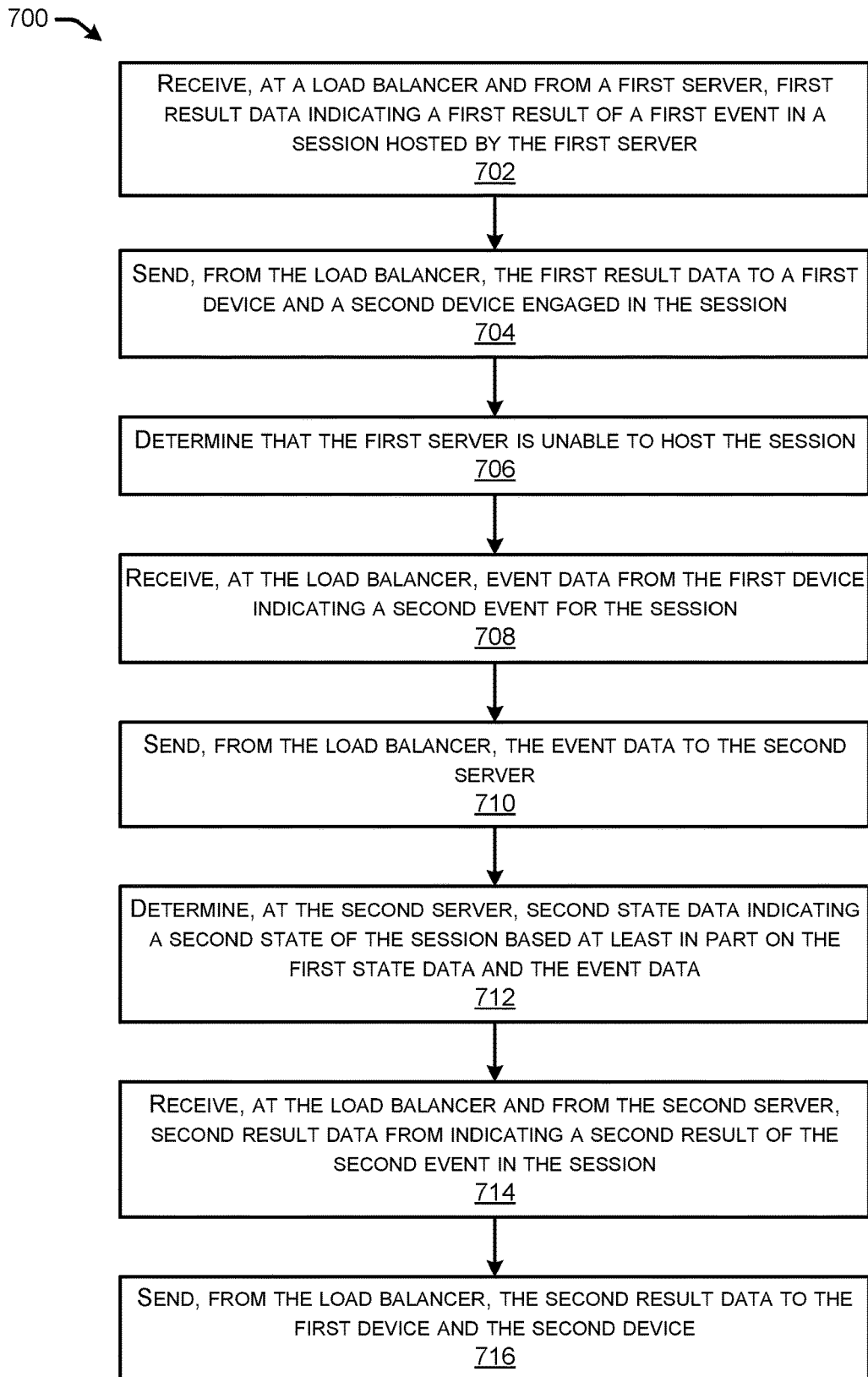
FIG. 7 illustrates a flow diagram of an example method for a load balancer to transition a session from a first server to a second server based at least in part on determining that the first server is unable to host the session.

FIG. 7 illustrates a flow diagram of an example method 700 for a load balancer 128 to transition a session 136 from a first server 124 to a second server 126 based at least in part on determining that the first server 124 is unable to host the session 136.

At 702, the load balancer may receive, from a first server 124, first result data 144 indicating a first result of a first event in the session 136. At 704, the load balancer 128 may send the first result data 144 to the first device 114 and the second device 114

At 706, the load balancer 128 (or another device) may determine that the first server 124 is unable to host the session 136. At 708, the load balancer 128 may receive event data 142 from the first device 124 indicating a second event for the session 136. At 710, the load balancer 128 may send the event data 142 to the second server 126.

At 712, the second server 126 may determine second state data 138 indicating a second state of the session based at least in part on the first state data 138 and the event data 142. At 714, the load balancer 128 may receive, from the second server 126, second result data 144 indicating a second result of the second event in the session 136. At 716, the load balancer 128 may send the second result data 144 to the first device 114 and the second device 114.

Figure 8:
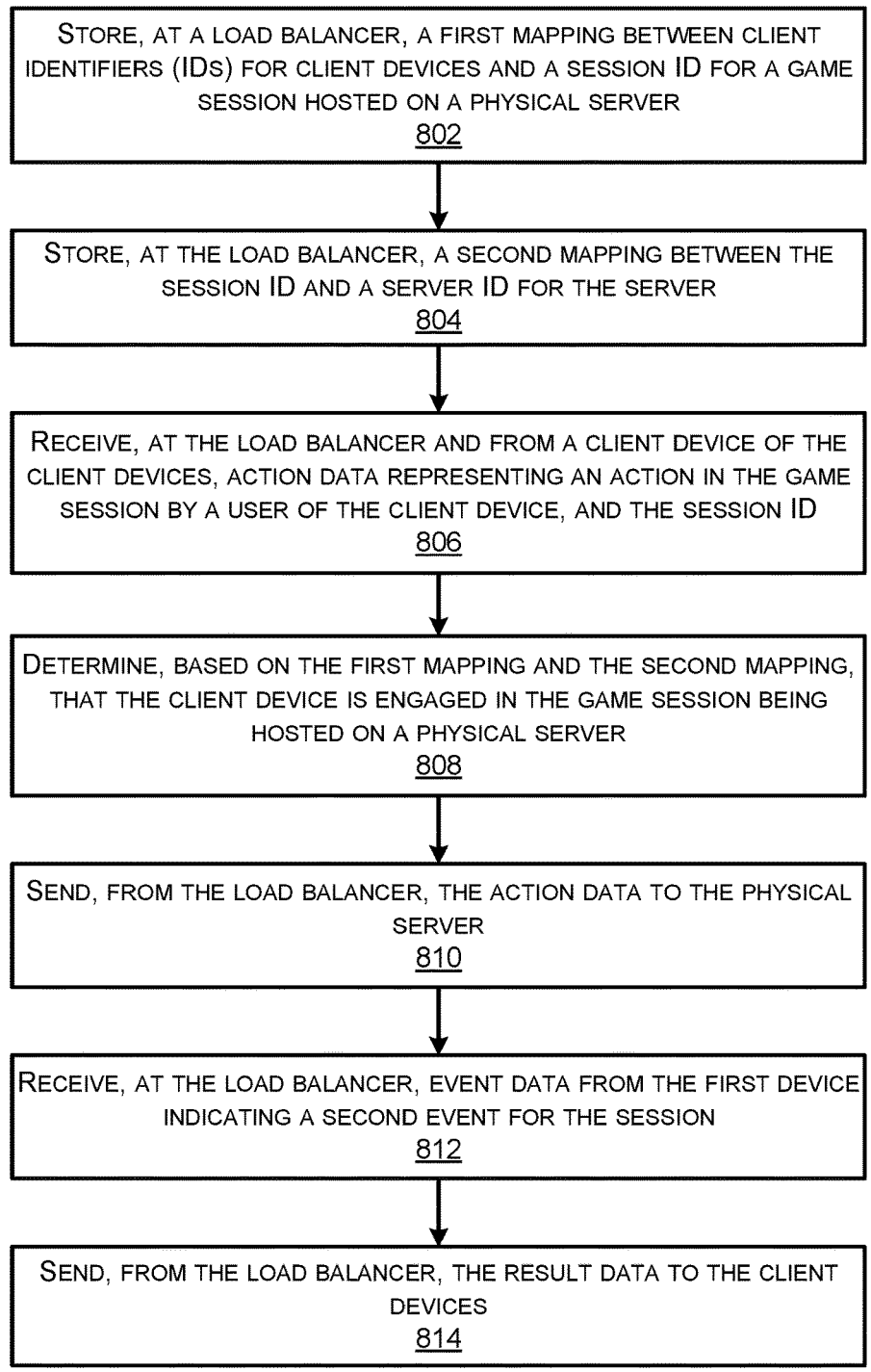
FIG. 8 illustrates a flow diagram of an example method for a load balancer to communicate action data and result data between client devices and a server that is hosting a game session for the client devices.

FIG. 8 illustrates a flow diagram of an example method 800 for a load balancer 128 to communicate action data 142 and result data 144 between client devices 114 and a server 124 that is hosting a game session 136 for the client devices 114.

In some examples, the operations of method 800 may be performed by a system comprising a physical server 124, disposed in a service provider network 102, hosting a game session 136 on behalf of client devices 114, and a load balancer 128, disposed in the service provider network 102, that communicates with the client devices 114 on behalf of the physical server 124. In some examples, the load balancer 128 stores a table 308 including a first mapping between client identifiers (IDs) 310 for the client devices 114 and a session ID 312 for the game session 316, and a second mapping between the session ID 312 and a server ID 314 for the physical server 124. The system may include one or more processors, and one or more computer-readable media storing computer-executable instructions that, when executed by the one or more processors, cause the one or more processors to perform the operations of method 800.

At 802, the load balancer 128 may receive from a client device 114 of the client devices 114, (i) action data 142 representing an action in the game session 136 by a user of the client device 114, and (ii) the session ID 312.

At 804, the load balancer 128 may determine, based on the first mapping and the second mapping, that the client device 114 is engaged in the game session 136 being hosted on the physical server 124. At 806, the load balancer 128 may send the action data 142 to the physical server 124. At 808, the physical server 124 may determine result data 144 indicating a result of the action on the game session 136. At 810, the load balancer 128 may receive a message including the result data 144 from the physical server 124 and an indication of the client IDs 310 for the client devices 114 engaged in the game session 136. At 812, the load balancer may send the result data 144 to the client devices 114.

In some examples, the method 800 may further include receiving, from a matchmaking server disposed in the service provider network 102, a session-registration message 134 comprising the session ID 312 and the server ID 314. In response to receiving the session-registration message 134, the load balancer 128 may select the physical server 124 to host the game session 136, and generate the second mapping between the session ID 312 and the server ID 314.

In some examples, the message may further include a first indication of protocol data usable to validate the message received from the physical server 124, and a second indication of the client IDs 310 for the client devices 114. In such examples, the load balancer 128 may validate the message using the protocol data.

In some examples, the method 800 may further include receiving, at the load balancer 128, a message from an additional client device 114 that includes (i) a request to add the additional client device 114 to the game session, and (ii) an indication of the session ID 312, and modifying, by the load balancer 128, a listing of the client IDs 310 to include an additional client ID 310 corresponding to the additional client device 114.

Figure 9:
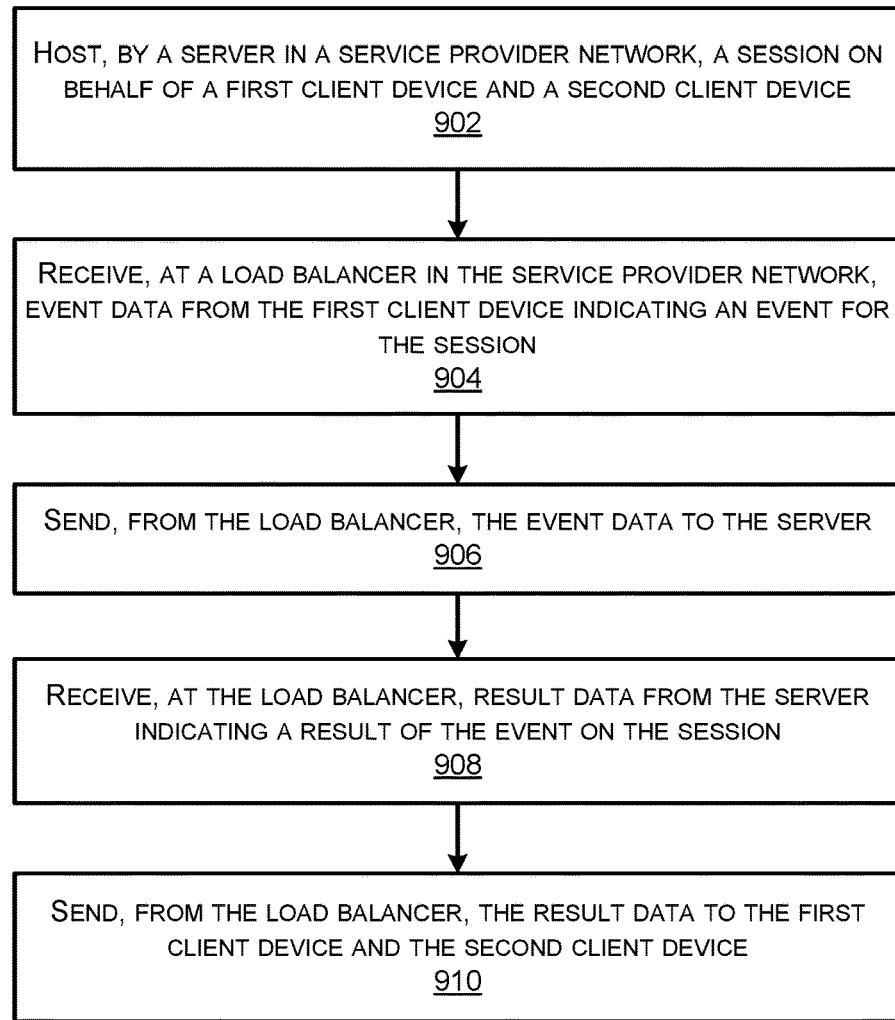
FIG. 9 illustrates a flow diagram of an example method for a load balancer to broadcast result data determined by a server hosting a session to client devices engaged in the session.

FIG. 9 illustrates a flow diagram of an example method 900 for a load balancer 128 to broadcast result data 144 determined by a server 124 hosting a session 136 to client devices 114 engaged in the session 136.

At 902, a server 124 in a service provider network 102 may host a session 136 on behalf of a first client device 114 and a second client device 114. At 904, a load balancer 128 may receive event data 142 from the first client device 114 indicating an event for the session 136.

At 906, the load balancer 128 may send the event data 142 to the server 124. At 908, the load balancer 128 may receive result data 144 from the server 124 indicating a result of the event on the session 136. At 908, the load balancer 128 may send the result data 144 to the first client device 118 and the second client device 118 (e.g., multicasting, broadcasting, etc.).

Figure 10:
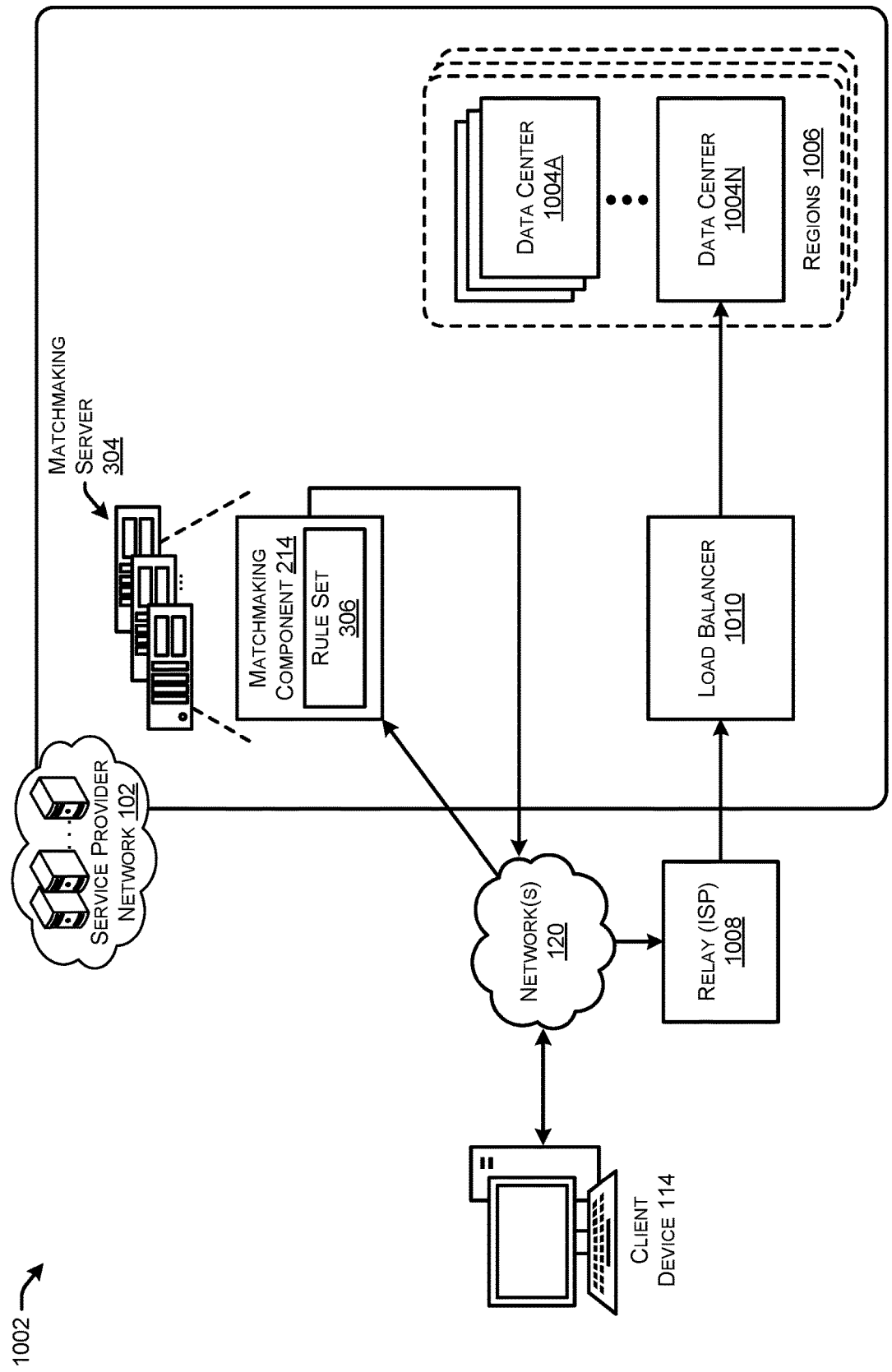
FIG. 10 is a system and network diagram that shows an illustrative operating environment that includes a service provider network that can be configured to implement aspects of the functionality described herein.

FIG. 10 is a system and network diagram that shows an illustrative operating environment that includes a service provider network 102 that can be configured to implement aspects of the functionality described herein. The service provider network 102 can provide computing resources, like VM instances and storage, on a permanent or an as-needed basis. Among other types of functionality, the computing resources 122 provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

The clients 112 and developers 110 that utilize the service provider network 102 may access the computing resources provided by the service provider network 102 over any wired and/or wireless network(s) 120, which can be a wide area communication network ("WAN"), such as the Internet, an intranet or an Internet service provider ("ISP") network or a combination of such networks. For example, and without limitation, a client device 114 operated by a client 112 of the service provider network 102 may be utilized to access the service provider network 102 by way of the network(s) 120. It should be appreciated that a local-area network ("LAN"), the Internet, or any other networking topology known in the art that connects the data centers 1004 to remote clients and other users can be utilized. It should also be appreciated that combinations of such networks can also be utilized.

As illustrated, the client devices 114 may be placed into a game session group or player group by the matchmaking component 214. The matchmaking component 214 may execute on the matchmaking server 304 and include a rule set 306 that groups clients 112 based on various factors, such as location, game preferences, experience or skill of the clients 112, and/or other factors. The matchmaking component 214 may then route the player groups into a queueing component 216 which places the player groups into queues 218 based on, for example, the geographic region 1006 of the client devices 114. For example, the queues 218 may place player groups located in certain geographic regions 1006 into queues such that the game sessions for those player groups are instantiated, created, or otherwise hosted by a VM instance 130 on a server located in a data center 1004 in the same geographic region 1006 (or geographically proximate or near) as the client devices 114. In this way, network latency may be reduced by having game sessions hosted on instances 130 in data centers 1004 in a near data center 1004 to the client devices 114.

As illustrated, the client device 114 may initially send a request to the matchmaking server 204 to place the client device in a game session hosted on a server of a data center 1004. The matchmaking component 214 may place the client device 114, and client 112, in a queue pool based on the rules set 306, and provide the client device 114 with an indication of what server to join for a game session 136. The client device 114 may then establish a game connection 140 by, in some examples, being routed through a relay 1008 that may be part of the ISP and render content on behalf of the client device 114. In such examples, the client device 114 may not be aware of the game server in the data center 1004 or a load balancer 1010 in the service provider network 102. The client device 114 may rely on the relay 1008, or depend on the relay 1008, to communicate content on behalf of the client device 114. The relay 1008 may be aware of the appropriate load balancer 1010, and/or may connect directly to the appropriate server in the data center 1004. However, in some examples, the client device 114 may connect directly to the load balancer 1010 or directly to a server in the data center 1004.

Figure 11:
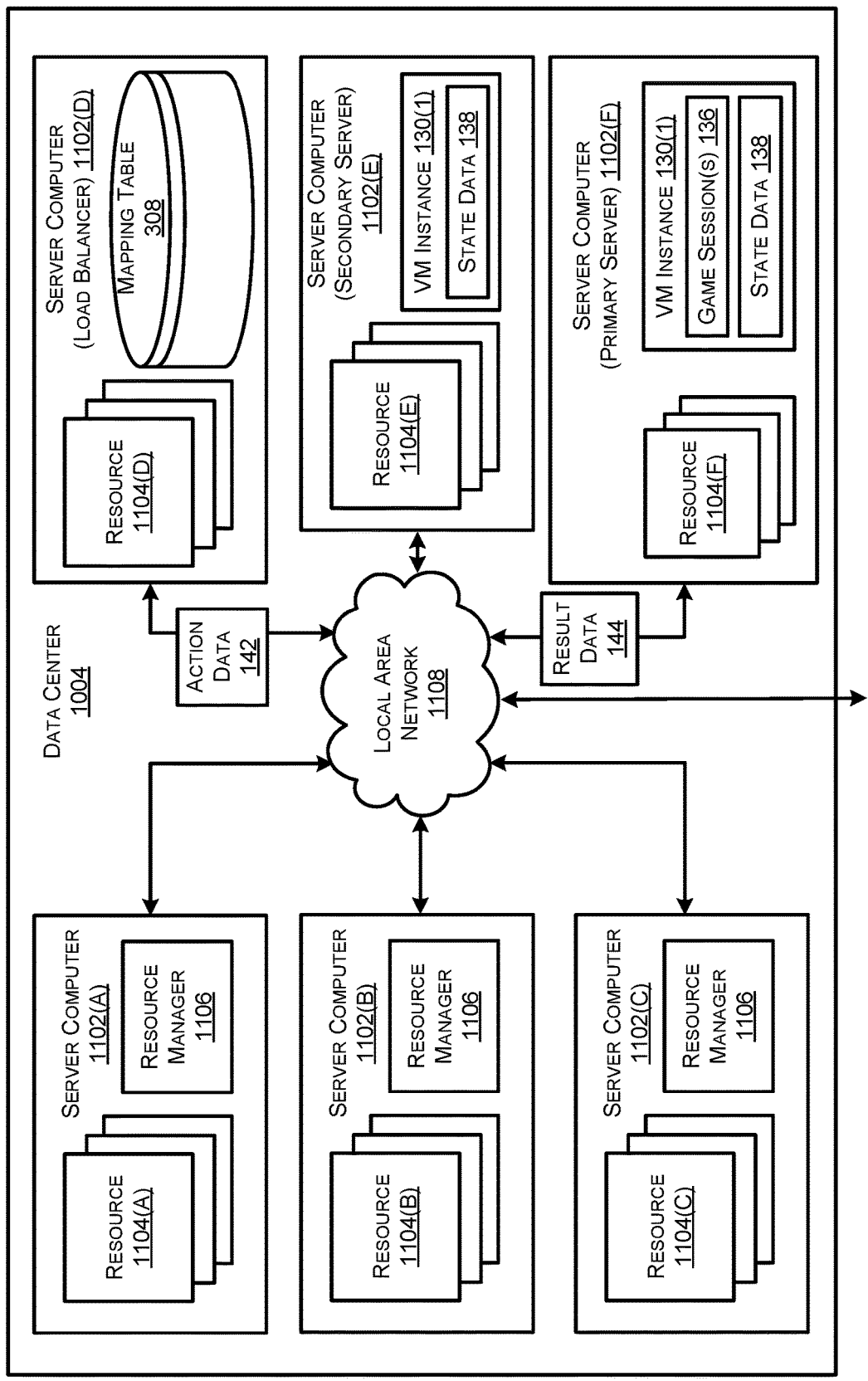
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the servers 124/126 in the computing resource network 122 described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

The data center 1004 shown in FIG. 11 also includes a server computer 1102F that can execute some or all of the software components described above. For example, and without limitation, the server computers 1102E and 1102F (and the other server computers 1102) can generally correspond to the game servers 124/126 of FIGS. 1A and 1B and be configured to execute components of the virtual instance 130 executing thereon, including the hosting the game sessions 136 and storing state data 138. Additionally, the server computer 1102D may be a load balancer 128 that stores the mapping table 308 and performs functions described herein by the load balancer 128. The server computers 1102D, 1102E, and 1102F can also be configured to execute other components and/or to store data for providing some or all of the functionality described herein. In this regard, it should be appreciated that the services illustrated in FIG. 11 as executing on the server computer 1102F can execute on many other physical or virtual servers in the data centers 1104 in various embodiments.

Figure 12:
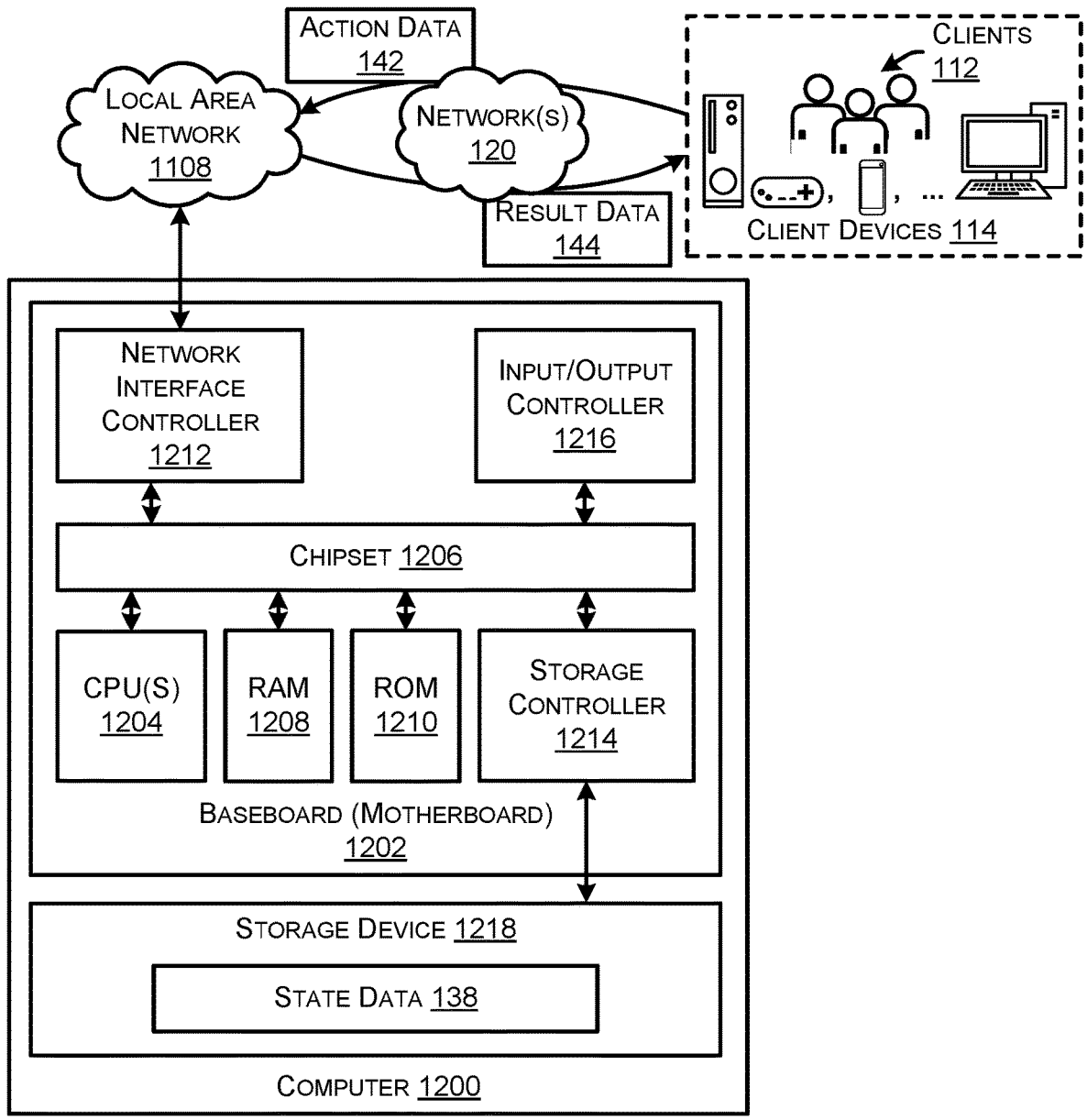
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. In some examples, the server computer 1200 may correspond to, or be the same as or similar to, a primary server 124 and/or secondary server 126 described in FIG. 1.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1108. The chipset 1206 can include functionality for providing network connectivity through a NIC 1212, such as a gigabit Ethernet adapter. The NIC 1212 is capable of connecting the computer 1200 to other computing devices over the network 1108 (or 120). It should be appreciated that multiple NICs 1212 can be present in the computer 1200, connecting the computer to other types of networks and remote computer systems.

The computer 1200 can be connected to a mass storage device 1218 that provides non-volatile storage for the computer. The mass storage device 1218 can store an operating system, programs (e.g., processes, agent, etc.), game state data 138, and data, which have been described in greater detail herein. The mass storage device 1218 can be connected to the computer 1200 through a storage controller 1214 connected to the chipset 1206. The mass storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1218 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1218 is characterized as primary or secondary storage, and the like.

For example, the computer 1200 can store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1218 by detecting the physical states or characteristics of one or more particular locations within the physical storage units.

In addition to the mass storage device 1218 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 102, and or any components included therein, may be supported by one or more devices similar to computer 1200. Stated otherwise, some or all of the operations performed by the service provider network 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 can store an operating system utilized to control the operation of the computer 1200. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1218 can store other system or application programs and data utilized by the computer 1200.

In one embodiment, the mass storage device 1218 or other computer-readable storage media is encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various processes described above with regard to FIGS. 1-9. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

As shown in FIG. 12, the VM instance 130 may store state data 138 for a game session 136. The server computer 1200 may receive action data 142 that is used to update the state data 138, and return result data 144 to a load balancer 128 and/or client devices 114 indicating a result of the action data 142 on the state data 138 and game session 136.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system for hosting game sessions in a service provider network, comprising:
    a first physical server disposed in the service provider network;
    a second physical server disposed in the service provider network;
    a load balancer, disposed in the service provider network, that is to communicate with client devices of a game session hosted by the service provider network, the load balancer configured to store a table including:
        a first mapping between client identifiers (IDs) for the client devices and a session ID for the game session hosted by the service provider network;
        a second mapping between the session ID and a first server ID for the first physical server; and
        a third mapping between the session ID and a second server ID for the second physical server; and
    one or more computer-readable media storing computer-executable instructions that, when executed by the load balancer, cause the load balancer to:
        designate the first physical server as a primary server for the game session and the second physical server as a secondary server for the game session;
        receive, from a client device of the client devices, (i) action data representing an action in the game session by a user of the client device, and (ii) the session ID;
        determine, based on the first mapping, the second mapping, and the third mapping, that the client device is engaged in the game session having the first physical server as the primary server and the second physical server as the secondary server;
        send the action data to the first physical server to enable the first physical server to determine first result data indicating a result of the action on the game session;
        send the action data to the second physical server to enable the second physical server to determine second result data indicating the result of the action on the game session;
        receive, at the load balancer, a message including the first result data from the first physical server and an indication of the client IDs for the client devices engaged in the game session; and
        send, from the load balancer, the first result data to the client devices, wherein the second result data is not sent to the client devices by either the second physical server refraining from sending the second result data to the load balancer or the load balancer ignoring the second result data.

2. The system of claim 1, comprising further computer-executable instructions that, when executed by the load balancer, cause the load balancer to:
    receive, from a matchmaking server disposed in the service provider network, a session-registration message comprising the session ID and the first server ID;
    in response to receiving the session-registration message:
        select the first physical server to host the game session; and
        generate the second mapping between the session ID and the first server ID.

3. The system of claim 1, wherein the message further includes:
    a first indication of protocol data usable to validate the message received from the first physical server; and
    a second indication of the client IDs for the client devices;
    comprising further computer-executable instructions that, when executed by the load balancer, cause the load balancer to validate the message using the protocol data.

4. The system of claim 1, comprising further computer-executable instructions that, when executed by the load balancer, cause the load balancer to:
    receive, at the load balancer, another message from an additional client device that includes (i) a request to add the additional client device to the game session, and (ii) an indication of the session ID; and
    modifying, by the load balancer, a listing of the client IDs to include an additional client ID corresponding to the additional client device.

5. The system of claim 1, wherein the game session is hosted by a first virtual machine on the first physical server and a second virtual machine on the second physical server.

6. A computer-implemented method comprising:
    designating a first server, disposed in a service provider network, as a primary server for a session on behalf of a first client device and a second client device;
    designating a second server, disposed in the service provider network, as a secondary server for the session;
    hosting, by the first server in the service provider network, the session;
    maintaining, at a load balancer that is disposed in the service provider network and that is to communicate with the first client device and the second client device, data associated with the first server, the session, the first client device, and the second client device, the load balancer to store:
        a first mapping between client identifiers (IDs), for the first client device and the second client device, and a session ID for the session;
        a second mapping between the session ID and a first server ID for the first server; and
        a third mapping between the session ID and a second server ID for the second server;
    determine, based at least in part on the first mapping, the second mapping, and the third mapping, that the first client device and the second client device are engaged in the session having the first server as the primary server and the second server as the secondary server;
    receiving, at the load balancer, event data from the first client device indicating an event for the session;
    sending, from the load balancer and based at least in part on the data, the event data to the first server;
    sending, from the load balancer and to the second server, the event data, the second server refraining from sending, to the load balancer, result data associated with the event data or the load balancer ignoring the result data sent by the second server;
    receiving, at the load balancer, the result data from the first server indicating a result of the event on the session;

sending, from the load balancer and based at least in part on the data, the result data to the first client device and the second client device;

determining that the first server is no longer able to host the session; and designating, based at least in part on determining that the first server is no longer able to host the session, the second server as the primary server to host the session.

7. The computer-implemented method of claim 6, wherein the session comprises a game session, and the event comprises an action taken by a user of the first client device with respect to the game session, further comprising:

prior to receiving the event data, determining, at the first server, first state data representing a first state of the game session; and determining, at the first server, second state data representing a second state of the game session based at least in part on the result of the action on the game session.

8. The computer-implemented method of claim 6, further comprising:

receiving, at the load balancer, a registration message from a matchmaking server disposed in the service provider network, the registration message including:
the session ID; and
the first server ID;

designating, based at least in part on the registration message, the first server to host the session; and storing, at the load balancer, an association between the session ID and the first server ID, the association indicating that the first server is hosting the session.

9. The computer-implemented method of claim 8, wherein the association comprises a first association, further comprising:

receiving, at the load balancer, a first request from the first client device to engage in the session;

storing, at the load balancer, a second association between a first client ID for the first client device and the session ID;

receiving, at the load balancer, a second request from the second client device to engage in the session; and storing, at the load balancer, a third association between a second client ID for the second client device and the session ID.

10. The computer-implemented method of claim 6, further comprising:

storing, at the load balancer, a listing of the client IDs for client devices engaged in the session, the listing of the client IDs including a first client ID and a second client ID;

receiving, at the load balancer, a message from a third client device that includes (i) a request to add the third client device to the session, and (ii) an indication of the session ID; and modifying, by the load balancer, the listing of the client IDs to include a third client ID corresponding to the third client device.

11. The computer-implemented method of claim 6, further comprising:

receiving, at the load balancer, an indication of protocol data usable to validate a message that includes the result data received from the first server; and validating the message including the result data using the protocol data.

12. The computer-implemented method of claim 6, further comprising:

receiving, at the load balancer, an indication of the client IDs for the first client device and the second client device, wherein sending the result data to the first client device and the second client device is performed based at least in part on receiving the indication of the client IDs.

13. The computer-implemented method of claim 6, further comprising:

updating, at the second server, the first state data to result in second state data indicating a second state of the session based at least in part on the event data.

14. The computer-implemented method of claim 13, further comprising:

maintaining, at the first server and the second server, the first state data and the second state data;

determining, by the load balancer, that the first server is no longer able to host the session based at least in part on an indication that the first server has been reclaimed by the service provider network to satisfy requirements of a new request received by the service provider network; and designating, by the load balancer and based at least in part on the indication, the second server to host the session.

15. A system comprising:

a first server disposed in a service provider network;

a second server disposed in the service provider network; and a load balancer, disposed in the service provider network, that is to communicate with a plurality of client devices associated with a session hosted by the service provider network, the load balancer configured to:

designate the first server as a primary server to host the session on behalf of a first client device and a second client device of the plurality of client devices;

designate the second server as a secondary server to host the session;

determine the first server to host the session on behalf of the first client device and the second client device;

maintain, at the load balancer, data associated with the first server, the session, the first client device, and the second client device, the load balancer to store mappings between:

client, for the first client device and the second client device, and a session ID for the session;

the session ID and a first server ID for the first server; and the session ID and a second server ID for the second server;

determine, based at least in part on the mappings, that the first client device and the second client device are engaged in the session having the first server as the primary server and the second server as the secondary server;

receive, from the first client device, event data indicating an event for the session;

send, to the first server and based at least in part on the data, the event data indicating the event, the event data enabling the first server to determine first result data indicating a result of the event on the session;

send, to the second server and based at least in part on the data, the event data indicating the event, the event data enabling the second server to determine second result data indicating the result of the event on the session;

receive, from the first server, the first result data and an indication of the client IDs; and send, based at least on part on the data, the first result data to the first client device and the second client device, wherein the second result data is not sent to the first client device and the second client device by either the second server refraining from sending the second result data to the load balancer or the load balancer ignoring the second result data.

16. The system of claim 15, wherein the load balancer is further configured to:
receive a registration message from a matchmaking server disposed in the service provider network, the registration message including:
the session ID; and
the first server ID; and
store an association between the session ID and the first server ID, the association indicating that the first server is hosting the session.

17. The system of claim 16, wherein the association comprises a first association, and wherein the load balance is further configured to:
receive a first request from the first client device to engage in the session;
store a second association between a first client ID for the first client device and the session ID;
receive a second request from the second client device to engage in the session; and
store a third association between a second client ID for the second client device and the session ID.

18. The system of claim 15, wherein the load balance is further configured to:
store a listing of the client IDs for client devices engaged in the session, the listing of the client IDs including a first client ID for the first client device and a second client ID for the second client device;
receive a message from a third client device of the plurality of client devices that includes (i) a request to add the third client device to the session, and (ii) a second indication of the session ID; and
modify the listing of the client IDs to include a third client ID corresponding to the third client device.

19. The system of claim 15, wherein the load balancer is further configured to:
receive, a second indication of protocol data usable to validate a message that includes the first result data received from the first server; and
validating the message including the first result data using the protocol data.

20. The system of claim 15,:
wherein sending the first result data to the first client device and the second client device is performed based at least in part on receiving the indication of the client IDs.

* * * * *